United States Patent
Arazaki et al.

(10) Patent No.: US 7,367,644 B2
(45) Date of Patent: May 6, 2008

(54) PRINTING APPARATUS, PRINTING PROGRAM, PRINTING METHOD, IMAGE PROCESSING APPARATUS, IMAGE PROCESSING PROGRAM, IMAGE PROCESSING METHOD, AND RECORDING MEDIUM HAVING THE PROGRAM RECORDED THEREON

(75) Inventors: Shinichi Arazaki, Shimosuwa (JP); Toru Miyamoto, Shiojiri (JP)

(73) Assignee: Seiko Epson Corporation (JP)

( * ) Notice: Subject to any disclaimer, the term of this patent is extended or adjusted under 35 U.S.C. 154(b) by 60 days.

(21) Appl. No.: 11/531,077

(22) Filed: Sep. 12, 2006

(65) Prior Publication Data

US 2007/0057986 A1 Mar. 15, 2007

(30) Foreign Application Priority Data

Sep. 12, 2005 (JP) .............................. 2005-263441
Jun. 21, 2006 (JP) .............................. 2006-171355

(51) Int. Cl.
  *B41J 2/205* (2006.01)
(52) U.S. Cl. .............................. 347/15; 347/19; 358/1.9
(58) Field of Classification Search .................. 347/15, 347/19, 43; 358/1.9, 1.2, 3.23
  See application file for complete search history.

(56) References Cited

U.S. PATENT DOCUMENTS 5,581,284 A * 12/1996 Hermanson .................. 347/43
6,575,549 B1 * 6/2003 Silverbrook ................. 347/19

FOREIGN PATENT DOCUMENTS

| JP | 01-129667 | 5/1989 |
|---|---|---|
| JP | 03-162977 | 7/1991 |
| JP | 06-340094 | 12/1994 |
| JP | 2002-191015 | 7/2002 |
| JP | 2003-063043 | 3/2003 |
| JP | 2003-136702 | 5/2003 |

* cited by examiner

*Primary Examiner*—Lamson Nguyen
(74) *Attorney, Agent, or Firm*—Harness, Dickey & Pierce, P.L.C.

(57) ABSTRACT

An apparatus includes: a print head having nozzles which can print different sized dots; a unit acquiring image data having M-value density information ($M \geq 3$) per pixel; a unit acquiring information regarding density unevenness of the nozzles; a unit performing N-valued processing ($M > N \geq 2$) on the acquired image to generate N-valued data; a unit generating print data from the generated N-valued data; and a unit that prints based on the generated print data, wherein the N-valued data generating unit determines generation ratios of the different sized dots for predetermined regions of the acquired image data based on the acquired density unevenness information, and performs N-valued processing ($M > N \geq 2$) on the image data based on the determined generation ratios.

14 Claims, 24 Drawing Sheets

EXAMPLE OF DOT PATTERN IN WHICH
FLIGHT DEFLECTION IS CAUSED

|   |   |   |   |
|---|---|---|---|
| 8 | 136 | 40 | 168 |
| 200 | 72 | 232 | 104 |
| 56 | 184 | 24 | 152 |
| 248 | 120 | 216 | 88 |

400

| NOZZLE No. | DOT RATIO TABLE TO BE SELECTED |
|---|---|
| NOZZLE 1 | TABLE 1 |
| NOZZLE 2 | TABLE 1 |
| NOZZLE 3 | TABLE 1 |
| NOZZLE 4 | TABLE 1 |
| NOZZLE 5 | TABLE 3 |
| NOZZLE 6 | TABLE 1 |
| NOZZLE 7 | TABLE 1 |
| NOZZLE 8 | TABLE 2 |
| NOZZLE 9 | TABLE 1 |
| NOZZLE 10 | TABLE 1 |
| NOZZLE 11 | TABLE 2 |
| ⋮ | ⋮ |

EXAMPLE OF IDEAL DOT PATTERN

EXAMPLE OF DOT PATTERN IN WHICH FLIGHT DEFLECTION IS CAUSED

EXAMPLE OF DOT PATTERN ON WHICH DENSITY UNEVENNESS CORRECTION HAS BEEN PERFORMED

EXAMPLE OF DOT PATTERN IN WHICH DOT MIXING RATIO HAS BEEN CHANGED

PRINTING APPARATUS, PRINTING PROGRAM, PRINTING METHOD, IMAGE PROCESSING APPARATUS, IMAGE PROCESSING PROGRAM, IMAGE PROCESSING METHOD, AND RECORDING MEDIUM HAVING THE PROGRAM RECORDED THEREON

RELATED APPLICATIONS

This application claims priority to Japanese Patent Application Nos. 2005-263441 filed Sep. 12, 2005 and 2006-171355 filed Jun. 21, 2006 which are hereby expressly incorporated by reference herein in their entirety.

BACKGROUND

1. Technical Field

The present invention relates to a printing apparatus, such as a printer of a facsimile machine, a copying machine, and OA equipment, a printing program, a printing method, an image processing apparatus, an image processing program, an image processing method, a recording medium having the program recorded thereon, etc., and particularly, the invention is suitable for a so-called ink-jet type printing apparatus which discharges fine particles of liquid inks of a plurality or colors onto a print sheet (printing medium) to draw predetermined characters and predetermined images, a printing program, a printing method, an image processing apparatus, an image processing program, an image processing method, and a recording medium having the program recorded thereon.

2. Related Art

Hereinafter, a printing apparatus, particularly a printer (hereinafter referred to as "ink jet printer") employing an ink jet system will be described.

Since ink jet printers generally provide low-price and high-quality color printed materials to be easily obtained, they have been widely used not only in offices but also by general users along with the widespread use of personal computers, digital cameras, and the like.

An ink jet printer is generally adapted such that predetermined characters and predetermined images are printed on a printing medium and thereby a desired printed material is produced by discharging (ejecting) particles of liquid ink in the form of dots from nozzles of a print head while a movable body called a carriage integrally provided with a cartridge and the print head reciprocates in a direction perpendicular to a sheet feed direction of the printing medium (sheet). Also, since the cartridge is provided with ink cartridges for four colors (black, yellow, magenta, and cyan) and a print head for each color, not only monochrome printing but also full color printing by combining the respective colors can be easily performed (furthermore, full color printing by combining six colors, seven colors, or eight colors in which light cyan, light magenta, etc. are added to the above four colors is also put to practical use).

Further, in the ink jet printer of the type that is adapted to perform printing while the print head on the carriage is caused to reciprocate in a direction perpendicular to the sheet feed direction, it is necessary to cause the print head to reciprocate from tens of times to 100 times or more in order to finely print an entire sheet. Therefore, an ink jet printer has a drawback in that the printing time is longer than printing apparatuses using other methods, for example, a laser printer using electrophotography, such as a copying machine.

In contrast, in an ink jet printer of the type in which a long print head having the same (or greater than) dimension as the width of a print sheet, and a carriage is not used, it is not necessary to move the print head in the width direction of the print medium and printing by a so-called one scanning (one pass) is provided. Therefore, the same high-speed printing as a laser printer is provided. Further, since a drive system, etc. for moving the carriage which carries the print head becomes unnecessary, this type of ink jet printer has an advantage in that a printer housing can be made compact and lightweight, and noise reduction also improves significantly. The ink jet printer of the former type is generally called a "multipass type" or a "serial" printer, and the ink jet printer of the latter type is generally called a "line-head type printer" "

Since the print head of such an ink jet printer is configured such that one row of or plurality of minute nozzles having a diameter of about 10 to 70 μm are arranged in a printing direction at regular intervals, a so-called "flight deflection phenomena" may occur, including a phenomenon that the ink discharge direction of some of the nozzles may be inclined due to manufacturing errors, a phenomenon that some nozzles may be disposed in positions which deviate from ideal positions, and a phenomenon that the landing position of a dot to be formed by the nozzles may deviate from a target point.

As a result, poor printing called a "banding (streak) phenomenon" may be caused in portions where printing is performed using the defective nozzles, thereby noticeably deteriorating printing quality. That is, if the "flight deflection phenomenon" is caused, the distance between dots discharged by adjacent nozzles will become uneven. As a result, a "white streak" (in a case in which a print sheet is white) will be generated in a portion where the distance between adjacent dots is large, and a "dark streak" will be generated in a portion where the distance between adjacent dots is short.

In particular, such a banding phenomenon tends to be caused more noticeably in the "line-head type printer" in which a print head or a printing medium is fixed one pass printing) than in the "multipass type printer" (serial printer) as mentioned above (in the multipass type printer, there is a technique that makes the banding inconspicuous by making the print head reciprocate several times).

Therefore, although research and development in hardware, including improvements in the manufacturing of a print head, improvements in the design thereof, etc. have been made in order to prevent poor printing caused by such a "banding phenomenon," it is difficult to provide a print head in which the "banding phenomenon" is 100% eliminated from the viewpoint of manufacturing cost, technology, etc.

Thus, under the present circumstances, in addition to improvements in hardware as mentioned above, a technique to reduce such a "banding phenomenon" using a so-called software technique, such as printing control, is also used.

For example, JP-A-6-340094 entitled "Ink-jet Recording Apparatus and Ink-jet Recording Method" suggests a method to reduce a "white streak" extending in a direction perpendicular to a nozzle arrangement direction, which is caused by the "banding phenomenon," by greatly changing the size of dots in the a driving direction (perpendicular to the nozzle arrangement direction) of a print head while the size of dots in the nozzle arrangement direction of the print head are made the same.

On the other hand, although such a banding phenomenon is caused by the flight deflection phenomenon as mentioned above, it is known that the banding phenomenon is also caused by the so-called "density unevenness."

That is, this "density unevenness" is a phenomenon in which a predetermined size of dot is no longer printed because the printing position is as normal, but the ink of each nozzle of the print head is not discharged as normal, unlike the printing deviation caused by the flight deflection phenomenon as mentioned above. Accordingly, in a case in which ink is not discharged at all (non-discharge) and the ink discharge amount is less than a specified value, no dot is printed or dots having a smaller size than a prescribed size are printed. Thereby, the density of only a line to be printed by the nozzle becomes low, and consequently a "white streak" or density unevenness similar to the "white streak" is generated in the portion. In contrast, if the ink discharge amount is excessively more than a specified value, dots having a larger size than a prescribed size are printed, and the density of a line to be printed by the nozzle becomes high, and consequently a "dark streak" or density unevenness similar to the "dark streak" is generated in the portion.

Therefore, for example, in JP-A-1-129667 and JP-A-3-162977, the variation with respect to the density data for every nozzle of a print head is considered density variation so as be corrected. Specifically, JP-A-1-129667 and JP-A-3-162977 suggest a method of trying to reduce any density variation by correcting the pixel value (density value) of a pixel of the image data corresponding to a nozzle whose ink discharge amount is less than a specified value so that the pixel value may be increased to a value greater than its original value, and in contrast, by correcting the pixel value (density value) of a pixel of the image data corresponding to a nozzle whose ink discharge amount is more than a specified value so that the pixel value may be decreased to a value smaller than its original value.

Further, for example, JP-A-2002-19101, JP-A-2003-136702, and JP-A-2003-63043 suggest a method of trying to reduce the density unevenness of a portion with dark density by using other colors for the color of the portion or increasing the ink discharge amount of a nozzle adjacent to a non-discharge nozzle with respect to a discharge failure phenomenon of a nozzle which does not discharge ink at all.

Meanwhile, in the above related art, with respect to the banding phenomenon resulting from either the "flight deflection" or the "density unevenness" caused by poor discharge, the effect of reducing the banding phenomenon can be exhibited somewhat, but it cannot be said that the effect is satisfactory. Further, it turned out that it is difficult to satisfactorily cope with the banding phenomenon resulting from both phenomena.

For example, although it is possible to reduce a "white streak" extending in a direction perpendicular to a nozzle arrangement direction by greatly changing the size of a dot as mentioned above with respect to the banding phenomenon resulting from "flight deflection," there is a problem in that the density of the portion becomes high and "density unevenness" is caused.

Meanwhile, although the method of using other colors for the color of a portion with dark density as mentioned above with respect to the banding phenomenon resulting from the "density unevenness" caused by poor discharge, can reduce a color difference, it cannot be said that the method is suitable for printing which requires high image quality because a color tone may change. Further, although the method of increasing the ink discharge amount of a nozzle adjacent to a non-discharge nozzle is effective in a portion with thin density, the ink discharge amount of the adjacent nozzle cannot be increased any more in a portion with dark density, but banding will still remain.

SUMMARY

Therefore, an advantage of the invention is that it provides a new printing apparatus which can eliminate the banding phenomenon caused by, particularly, flight deflection or density unevenness, or can make the banding phenomenon nearly inconspicuous, a printing program, a printing method an image processing apparatus, an image processing program, an image processing method, and a recording medium having the program recorded thereon.

Aspect 1:

According to Aspect 1 of the invention, there is provided a printing apparatus including: a print head in which a plurality of nozzles which can print different sizes of dots are arranged; an image data acquiring unit which acquires image data having the M-value density information (M≧3) for every pixel; a density unevenness information acquiring unit which acquires information on the density unevenness of the nozzles of the print head; an N-valued data generating unit which performs N-valued processing (M>N≧2) on the image data acquired by the image data acquiring unit to generate N-valued data; a print data generating unit which generates print data from the N-valued data generated by the N-valued data generating unit; and a printing unit which performs printing using the print head based on the print data generated by the print data generating unit. The N-valued data generating unit determines the generation ratios of the different sizes of dots for every predetermined region of the image data acquired by the image data acquiring unit based on the density unevenness information acquired by the density unevenness information acquiring unit, and performs N-valued processing (M>N≧2) on the image data based on the determined generation ratios.

Since this allows different sizes of dots to be appropriately mixed in a printed image composed of a plurality of dots, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Further, it is possible to eliminate the banding phenomenon or make the banding phenomenon nearly inconspicuous only in a portion where any density unevenness is being caused, by determining the proper generation frequency of dots having each size for every nozzle according to density unevenness, and changing the mixing ratio of dots with respect to that when there is no density unevenness.

Further, the term "dot" in the present aspect is a base unit representing characters and figures of a printed material, and means one region where ink has reached a recording medium from one nozzle or a plurality of nozzles. Further, a plurality of kinds of this "dot" consist for every size as well as the area having not "zero" but a constant size (area). Further, the shape of a dot is not necessarily limited to a true circular shape, but shall also include shapes other than the true circular shape, such as an elliptical shape. In this case, since the diameter of the other shapes is not uniform, the dot size shall be determined by the area occupied by a dot or based on the average diameter of a dot (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

In addition, if this "dot diameter" is defined more strictly, assuming an equivalent dot in the form a true circle having the area equal to the area of a dot formed by discharging a certain amount of ink, the diameter of the equivalent dot shall be the dot size. Further, generally, since the absorptivity of ink, etc. will also change depending on a printing medium, even if the amount of ink is the same, it is a matter of course that, if the recording medium changes, the diameter of a dot to be formed will change in various ways. Further, this "dot" shall not be necessarily limited to a drop formed of a single ink drop by one discharge, and shall also include a drop formed by combining ink drops by two or more discharges like a very large dot, etc.

Further, "N-valued processing (M>N≧2)," though it will be described in full detail in the following embodiments, is processing which sorts each pixel into N kinds (M>N≧2) for the image data having M-value (M≧3) density information (for example, 8 bits, 256 gray-scale levels) based on a certain threshold, and the processing includes the concept that the size of dots is changed in several stages according to the size of a pixel value, other than the so-called "binary" such that a dot is printed or a dot is not printed (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the reason why the value of the "N" is set to "M>N≧2" is because, in order to generate the data for printing, it is necessary to specify at least the binarization on whether a dot is printed or a dot is not printed, and to make the N value smaller than an original pixel value (M≧3) of the image data to be processed in terms of the size of a dot capable of being printed by a print head (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the "banding phenomenon" shall also include a variation in dot size caused by the excess and deficiency of the discharge amount of ink from a nozzle (of a print head) or the "density unevenness" resulting from failed dot printing caused by non-discharge of ink, in addition to poor printing caused by a "white streak" or a "dark streak" generated by the "flight deflection," (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the "flight deflection" means a phenomenon that a dot may be formed off from its target position due to the fact that, though ink is discharged, the discharge direction of ink of some of the nozzles is inclined, unlike a mere non-discharge phenomenon of some nozzles as mentioned above (This is true of the descriptions in the following sections, such as an aspect concerning a "printing apparatus," an aspect concerning a "printing program, an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the "white streak" shall also include a portion with low density which may become conspicuous in a streak due to the "density unevenness" in addition to a portion (region) where the phenomenon that the distance between adjacent dots becomes longer than a predetermined distance is caused continuously due to the "flight deflection," and consequently the color of the ground of a printing medium may become conspicuous in a streak (This is true of the descriptions in the following sections, such as an aspect concerning a "printing apparatus," an aspect concerning a "printing program," an aspect concerning a "printing method," an aspect concerning an image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, similarly, the "white streak" shall also include a portion with high density which may become conspicuous in a dark streak due to the "flight deflection" in addition to a portion (region) where the phenomenon that the distance between adjacent dots becomes shorter than a predetermined distance is caused continuously due to the "flight deflection," and consequently the color of the ground of a printing medium may become invisible, or the color looks relatively dark when the distance between dots becomes short, and a portion of a dot formed off from its normal position is overlapped with a normal dot, and consequently the overlapping portion may become conspicuous in a dark streak (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the "density unevenness information" of the print head acquired by the density unevenness information acquiring unit shall also include the information on the "flight deflection" for every nozzle, that is, the information on the printing deviation amount (difference amount) from an assumed printing position caused by at least the flight deflection, etc., and a printing deviation direction from an assumed printing direction, and the information on the deviation amount (difference amount) between an assumed printing dot size and an actual printing dot size and the deviation amount (difference amount) between an assumed ink discharge amount and an actual ink discharge amount, in addition to the information on the "density unevenness" for every nozzle as mentioned above. That is, there is a deviation of an actual value to each assumed value as a factor which causes the density unevenness. As the amount of this deviation becomes great in a direction in which the printing density becomes great, the density unevenness also becomes conspicuous (This is true of the descriptions in the following sections, such as an aspect concerning a "printing apparatus," an aspect concerning a "printing program, an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the "N-valued data generating unit," for example, sets a predetermined threshold as a criterion for determination of the density unevenness, and determines the generation ratio of dots having each size depending on whether the acquired density unevenness information exceeds the threshold, and, if the density unevenness information exceed the threshold, depending on how much the density unevenness information has exceeded the threshold. For example, if the acquired density unevenness information is smaller than the threshold, the N-valued generating unit may determine the dot generation ratio so as to be a normal dot generation ratio, and if the acquired density unevenness information exceeds the threshold, the N-valued generating unit may determine the dot generation ratio so that the generation ratio of dots having a relatively large size may become greater than a normal dot generation ratio. Further, the N-valued generating unit may determine the generation ratio so that, as a value exceeding the threshold becomes great, the generation ratio of dots having a relatively large size may become great accordingly (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, for example, in a case in which a print head separately prints three kinds of sizes of dots including a small dot, a middle dot, and a large dot, the "generation ratio" is a generation ratio that the number of small dots to be formed, the number of middle dots to be formed, or the number of dots to be formed is specified with respect to the total number of print dots formed per unit area in each density value. For example, in a case in which the generation ratios of small dots, middle dots, and large dots with respect to a certain density value are specified as 120, 10, and 30, respectively, which size of dots are to be formed with respect to the density value is determined according to these numbers. Further, the mixing ratio of dots having each size is also changed by changing this generation ratio. That is, in this aspect, the generation ratio is determined based on the acquired density unevenness information such that the mixing ratio of dots makes the density unevenness inconspicuous (This is true of the descriptions in the following sections, such as an aspect concerning a "printing apparatus," an aspect concerning a "printing program," an aspect concerning a "printing method," an aspect concerning an image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Aspect 2:

The printing apparatus of Aspect 2 is a printing apparatus according to Aspect 1 in which the information on the density unevenness includes the information on a difference value between a density value of a dot formed by each of the nozzles of the print head and an assumed density value.

That is, the density unevenness is a density unevenness which is caused owing to a variation in the performance of the nozzles which constitutes a print head, and a density unevenness which is caused owing to a density fluctuation which is generated when the density of an actually printed dot exceeds an assumed density or falls below an assumed density. Accordingly, in this aspect, since the data on a difference value between an actual value and an assumed value of the density in this density fluctuation is provided as the density unevenness information, it is possible to determine a suitable dot generation ratio for every predetermined region of the image data. Since this allows different sizes of dots to be appropriately mixed in a printed image composed of a plurality of dots, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Aspect 3:

The printing apparatus of Aspect 3 is a printing apparatus according to Aspect 1 or 2 in which, if it is determined that the difference value of the density value of the dot to be formed by each of the nozzles of the print head is greater than a predetermined threshold based on the information on the density unevenness, the N-valued data generating unit makes it greater than that when the generation ratio of large-sized dots is not determined.

That is, as a difference value between a density value of an actually printed dot and an assumed density value becomes great, the density unevenness becomes conspicuous. Therefore, for example, in a case in which three sizes of dots including a small dot, a middle dot, and a large dot are separately printed, it is possible to keep the density unevenness from becoming conspicuous by increasing the generation ratio of the large dot according to the size of the difference value. Since this allows different sizes of dots to be appropriately mixed in a printed image composed of a plurality of dots, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily. That is, in a case in which the density unevenness is great, the granularity will deteriorate because large-sized dots increase by increasing the generation ratio of the large-sized dots, but the density unevenness that is a factor of greater image quality deterioration can be made inconspicuous.

Here, the "relatively large-sized dot" is just a large dot, for example, in the case of three sizes of dots including a small dot, a middle dot, and a large dot as described above, and it may sometimes indicate dots ranging from a maximum size of dot to a dot having a predetermined size near the maximum size, such as a maximum size of dot, and a dot having a smaller size than the maximum size, in a case in which dots having more sizes than the three sizes of dots are printed (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Aspect 4:

The printing apparatus of Aspect 4 is a printing apparatus according to Aspect 3, further including a density unevenness correcting unit which corrects the density value of each pixel of the image data acquired by the image data acquiring unit based on the density unevenness information acquired by the density unevenness information acquiring unit. The N-valued data generating unit is adapted to perform N-valued processing on the image data corrected by the density unevenness correcting unit to generate N-valued data.

That is, this aspect further includes a density unevenness correcting unit in addition to the configuration of Aspect 3, and is adapted to correct the density value of each pixel of the image data acquired by the image data acquiring unit based on the density unevenness information acquired by the density unevenness information acquiring unit, using this density unevenness correcting unit, and thereafter, to perform N-valued processing.

That is, since the generation ratio is determined after the density unevenness has been corrected in advance by subtracting and adding a difference value between an actual value and an assumed value to/from each pixel value of image data, the generation ratio of large-sized dots in a portion which cannot be corrected by the density correction processing can be increased. Thus, a portion recognized as the density unevenness becomes less than when the generation ratio is determined without correction (or the size of the density unevenness becomes small). Therefore, it is possible to relatively reduce the increasing amount of large-sized dots. Since this can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained.

Aspect 5:

The printing apparatus of Aspect 5 is a printing apparatus according to Aspect 3, further including a dot ratio information storing unit which stores dot ratio information which specifies the mixing ratios of the different sizes of dots, and a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data acquired by the image data acquiring unit based on the dot ratio information selected by the dot ratio information selecting unit, and performs N-valued processing (M>N≧2) on the image data based on the determined generation ratios.

That is, this aspect further includes a dot ratio information storing unit and a dot ratio information selecting unit in addition to the configuration of Aspect 3, and is adapted to perform N-valued processing on the image data acquired by the image data acquiring unit so that it may become a generation ratio (dot mixing ratio) specified in the dot ratio information selected by the dot ratio information selecting unit.

That is, the generation ratio can be simply determined only by preparing a plurality of kinds of dot ratio information in advance according to situations of occurrence of the density unevenness, and selecting the dot ratio information corresponding to the acquired density unevenness information from the plurality of kinds of dot ratio information. Since this allows N-valued processing to be efficiently performed according to a generation ratio specified in the selected dot ratio information, it is possible to more efficiently eliminate the banding phenomenon or make the banding phenomenon nearly inconspicuous.

Here, as the "method of selecting dot ratio information", the threshold which determines a normal value and an abnormal value is set in advance for the numerical values which show the density unevenness, and typical dot ratio information is selected or abnormal dot ratio information is selected depending on whether or not a value exceeds the threshold. This threshold is set, for example, for every plural kinds of dot ratio information, and for example, the dot ratio information of the greatest threshold among exceeding thresholds is selected (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Further, the "dot ratio information" may be prepared, for example, in units of a nozzle, and may be prepared in units of plural nozzles (for example, a target nozzle and nozzles in the vicinity of the target nozzle). For example, in a case in which the dot ratio information is prepared in units of a nozzle, the dot ratio information is selected for every corresponding pixel, and in a case in which the dot ratio information is prepared in units of plural nozzles, the dot ratio information is selected for every corresponding plural pixels (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Aspect 6:

The printing apparatus of Aspect 6 is a printing apparatus according to Aspect 3, further including a density unevenness correcting unit which corrects the density value of each pixel of the image data acquired by the image data acquiring unit based on the density unevenness information acquired by the density unevenness information acquiring unit, a dot ratio information storing unit which stores dot ratio information which specifies the mixing ratios of the different sizes of dots, and a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data corrected by the density unevenness correcting unit based on the dot ratio information selected by the dot ratio information selecting unit, and performs N-valued processing (M>N≧2) on the image data based on the determined generation ratios.

That is, this aspect further includes a density unevenness correcting unit, a dot ratio information storing unit, and a dot ratio information selecting unit in addition to the configuration of Aspect 3, and is adapted to perform N-valued processing on the image data acquired by the image data acquiring unit so that it may become a generation ratio (dot mixing ratio) specified in the dot ratio information after the pixel value of the image data corresponding to a nozzle which causes density unevenness has been corrected in advance like Aspect 3.

That is, since the generation ratio is determined after the density unevenness has been corrected in advance by subtracting and adding a difference value between an actual value and an assumed value to/from each pixel value of image data, the generation ratio of large-sized dots in a portion which cannot be corrected by the density correction processing can be increased. Thus, a portion recognized as the density unevenness becomes less than when the generation ratio is determined without correction (or the size of the density unevenness becomes small). Therefore, it is possible to relatively reduce the increasing amount of large-sized dots. Since this can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained.

That is, the generation ratio can be simply determined only by preparing a plurality of kinds of dot ratio information in advance according to situations of occurrence of the density unevenness, and selecting the dot ratio information corresponding to the acquired density unevenness information from the plurality of kinds of dot ratio information. Since this allows N-valued processing to be efficiently performed according to a generation ratio specified in the selected dot ratio information, it is possible to more efficiently eliminate the banding phenomenon or make the banding phenomenon nearly inconspicuous.

Aspect 7:

The printing apparatus of Aspect 7 is a printing apparatus according to Aspect 4 or 5, in which the dot ratio information selecting unit is adapted to select a predetermined item of dot ratio information from the dot ratio information stored in the dot ratio information storing unit for every plural nozzles including a target nozzle of the print head, and nozzles in the vicinity of the target nozzle. Since this allows the generation ratio (dot mixing ratio) to be determined in units of plural nozzles including a target nozzle of a print head and about two to ten nozzles before and after the target nozzle, it is possible to more effectively eliminate the banding phenomenon resulting from the density unevenness as well as the flight deflection or make the banding phenomenon nearly inconspicuous.

That is, in a case in which processing is performed so that the generation ratio of large-sized dots may become great only on a line of a target nozzle, there is a case that the density unevenness cannot be eliminated from the relationship (for example, further away than when the distance between dots has not been determined) to its peripheral line. Even in such a case, in this aspect, the generation ratio is determined for every region including a line to be formed by a nozzle (target nozzle) which causes density unevenness and a line to be formed by a nozzle in the vicinity of the target nozzle. Thus, a lot of relatively large-sized dots are formed not only in a target line but also in the lines at both sides of the target line. Thus, these synergetic effects can eliminate the density unevenness which cannot be eliminated only with the target line.

Aspect 8:

The printing apparatus of Aspect 8 is a printing apparatus according to any one of Aspects 4 to 6, in which the dot ratio information selecting unit is adapted to select a predetermined item of dot ratio information among the dot ratio information stored in the dot ratio information storing unit based on the information on a printing position deviation amount of the print head among the density unevenness information acquired by the density unevenness information acquiring unit. Since this allows optimal processing to be performed based on the flight deflection amount (the deviation amount from an assumed printing position), it is possible to effectively eliminate the banding phenomenon or make the banding phenomenon nearly inconspicuous while avoiding deterioration of image quality.

Aspect 9:

The printing apparatus of Aspect 9 is a printing apparatus according to any one of Aspects 4 to 6, in which the dot ratio information selecting unit is adapted to select two or more kinds of dot ratio information among the dot ratio information stored in the dot ratio information storing unit based on the information on a printing position deviation amount of the print head among the density unevenness information acquired by the density unevenness information acquiring unit, and in which the N-valued data generating unit determines the generation ratios of the different sizes of dots for every predetermined region of the image data based on the two or more kinds of dot ratio information selected by the dot ratio information selecting unit, and performs N-valued processing (M>N≧2) on the image data based on the determined generation ratios. Thereby, in a case in which the banding phenomenon is caused in a plurality of places within one processing region, optimal processing according to the degree in each place can be performed. Therefore, it is possible to effectively eliminate the banding phenomenon or make the banding phenomenon nearly inconspicuous while avoiding deterioration of image quality.

Here, the "based on two or more kinds of dot ratio information" means that, for example, in a case in which there is two kinds of dot ratio information, these two kinds of dot ratio information are mixed together, thereby a piece of dot ratio information having an intermediate characteristic of the two kinds of dot ratio information is generated, and the generated dot ratio information becomes a basis. Further, in a case in which there are three or more kinds of dot ratio information, two or more kinds of dot ratio information are selected from the three or more kinds of dot ratio information according to density unevenness information, and the two or more kinds of selected dot ratio information are mixed, thereby generating the dot ratio information having an intermediate characteristic of the two or more kinds of selected dot ratio information. Further, as well as mixing dot ratio information to generate new information, the use ratio of two or more kinds of dot ratio information may be determined so that two or more kinds of dot ratio information can be used in this determined use ratio. Further, for example, in a case in which the use ratio of two pieces of dot ratio information is set to 50%, the generation ratio is determined for every predetermined region of image data by using these two pieces of dot ratio information by turns (This is true of the descriptions in the following sections, such as an aspect concerning a "printing apparatus," an aspect concerning a "printing program," an aspect concerning a "printing method," an aspect concerning an "image processing apparatus," an aspect concerning an "image processing program," an aspect concerning an "image processing method," an aspect concerning "recording medium having the program recorded thereon," and "DESCRIPTION OF EXEMPLARY EMBODIMENTS").

Aspect 10:

Further, according to Aspect 10 of the invention, there is provided a printing program which causes a computer to function as: an image data acquiring unit which acquires image data having M-value density information ($M \geq 3$) for every pixel; a density unevenness information acquiring unit which acquires information on the density unevenness of the nozzles which can print different sizes of dots; an N-valued data generating unit which performs N-valued processing ($M > N \geq 2$) on the image data acquired by the image data acquiring unit to generate N-valued data; a print data generating unit which generates print data from the N-valued data generated by the N-valued data generating unit; and a printing unit which performs printing based on the print data generated by the print data generating unit. Here, the program causes the N-valued data generating unit to function to determine the generation ratios of the different sizes of dots for every predetermined region of the image data acquired by the image data acquiring unit based on the density unevenness information acquired by the density unevenness information acquiring unit, and to perform N-valued processing ($M > N \geq 2$) on the image data based on the determined generation ratios.

This, similar to Aspect 1, can effectively eliminate the banding phenomenon, such as a white streak or a dark streak, which is generated by the so-called flight deflection or density unevenness, or make the banding phenomenon nearly inconspicuous. As a result, a high-quality printed material can be obtained. Further, it is possible to eliminate the banding phenomenon or make the banding phenomenon nearly inconspicuous only in a portion where any density unevenness is being caused, by determining the proper generation frequency of dots having each size for every nozzle according to density unevenness, and changing the mixing ratio of dots with respect to that when there is no density unevenness.

Further, since most of printing apparatuses that are presently on the market, such as ink jet printers, includes a computer system composed of a central processing unit (CPU), storage devices (RAM, ROM), input/output devices, etc., and the above respective units can be realized by software using this computer system, these respective units can be realized economically and easily compared with a case where the above respective units can be realized by making exclusive hardware. Furthermore, upgrade by alterations, improvements, etc. of functions can also be easily performed by rewriting a portion of the program.

Aspect 11:

The printing program of Aspect 11 is a printing program according to Aspect 10 in which the information on the density unevenness includes the information on a difference value between a density value of a dot formed by each of the nozzles of the print head and an assumed density value.

Since this allows different sizes of dots to be more appropriately mixed in a printed image composed of a plurality of dots similarly to Aspect 2, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Further, similar to Aspect 10, since the above respective units can be realized using a computer system provided standard in most of printing apparatuses that are presently on the market, such as ink jet printers, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 12:

The printing program of Aspect 12 is a printing program according to Aspect 10 or 12, in which, if it is determined that the difference value of the density value of the dot to be formed by each of the nozzles of the print head is greater than a predetermined threshold based on the information on the density unevenness, the N-valued data generating unit makes it greater than that when the generation ratio of large-sized dots is not determined.

Since this allows different sizes of dots to be more appropriately mixed in a printed image composed of a plurality of dots similarly to Aspect 3, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Further, similar to Aspect 10, since the above respective units can be realized using a computer system provided standard in most of printing apparatuses that are presently on the market, such as ink jet printers, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 13:

The printing program of Aspect 13 is a printing program according to Aspect 12 causing a computer to function as a density unevenness correcting unit which corrects the density value of each pixel of the image data acquired by the image data acquiring unit based on the density unevenness information acquired by the density unevenness information acquiring unit. The N-valued data generating unit performs N-valued processing on the image data corrected by the density unevenness correcting unit to generate N-valued data.

Since this, similar to Aspect 4, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained.

Further, similar to Aspect 10, since the above respective units can be realized using a computer system provided standard in most of printing apparatuses, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 14:

The printing program of Aspect 14 is a printing program according to Aspect 12, causing a computer to function as a dot ratio information storing unit which stores dot ratio information which specifies the mixing ratios of the different sizes of dots, a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data acquired by the image data acquiring unit based on the dot ratio information selected by the dot ratio information selecting unit, and performs N-valued processing (M>N≧2) on the image data based on the determined generation ratios.

Since this, similar to Aspect 5, allows N-valued processing to be efficiently performed according to a generation ratio specified in the selected dot ratio information, it is possible to more efficiently eliminate the banding phenomenon or make the banding phenomenon nearly inconspicuous.

Further, similar to Aspect 10, since the above respective units can be realized using a computer system provided standard in most of printing apparatuses, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 15:

The printing program of Aspect 15 is a printing program according to Aspect 12, causing a computer to function as density unevenness correcting unit which corrects the density value of each pixel of the image data acquired by the image data acquiring unit based on the density unevenness information acquired by the density unevenness information acquiring unit, a dot ratio information storing unit which stores dot ratio information which specifies the mixing ratios of the different sizes of dots, and a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data corrected by the density unevenness correcting unit based on the dot ratio information selected by the dot ratio information selecting unit, and performs N-valued processing (M>N≧2) on the image data based on the determined generation ratios.

Since this, similar to Aspect 6, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained. Further, since this allows N-valued processing to be efficiently performed according to a generation ratio specified in the selected dot ratio information, it is possible to more efficiently eliminate the banding phenomenon or make the banding phenomenon nearly inconspicuous.

Further, similar to Aspect 10, since the above respective units can be realized using a computer system provided standard in most of printing apparatuses, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 16:

The printing program of Aspect 16 is a printing program according to Aspect 13 or 14, in which the dot ratio information selecting unit selects a predetermined item of dot ratio information from the dot ratio information stored in the dot ratio information storing unit for every plural nozzles including a target nozzle of the print head, and nozzles in the vicinity of the target nozzle.

Since this, similar to Aspect 7, allows the generation ratio (dot mixing ratio) to be determined in units of plural nozzles including a target nozzle of a print head and about two to ten nozzles before and after the target nozzle, it is possible to more effectively eliminate the banding phenomenon resulting from the density unevenness as well as the flight deflection or make the banding phenomenon nearly inconspicuous.

Further, similar to Aspect 10, since the above respective units can be realized using a computer system provided standard in most of printing apparatuses, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 17:

The printing program of Aspect 17 is a printing program according to any one of Aspects 13 to 15, in which the dot ratio information selecting unit selects a predetermined item of dot ratio information among the dot ratio information stored in the dot ratio information storing unit based on the information on a printing position deviation amount of the print head among the density unevenness information acquired by the density unevenness information acquiring unit.

Since this, similar to Aspect 8, allows optimal processing to be performed based on the flight deflection amount (the deviation amount from an assumed printing position), it is possible to effectively eliminate the banding phenomenon or make the banding phenomenon nearly inconspicuous while avoiding deterioration of image quality.

Further, similar to Aspect 10, since the above respective units can be realized using a computer system provided standard in most of printing apparatuses, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 18:

The printing program of Aspect 18 is a printing program according to any one of Aspects 13 to 15, in which the dot ratio information selecting unit selects two or more kinds of dot ratio information among the dot ratio information stored in the dot ratio information storing unit based on the information on a printing position deviation amount of the print head among the density unevenness information acquired by the density unevenness information acquiring unit, and in which the N-valued data generating unit determines the generation ratios of the different sizes of dots for every predetermined region of the image data based on the two or more kinds of dot ratio information selected by the dot ratio information selecting unit, and performs N-valued processing (M>N≧2) on the image data based on the determined generation ratios.

Thereby, similar to Aspect 9, in a case in which the banding phenomenon is caused in a plurality of places within one processing region, optimal processing according to the degree in each place can be performed. Therefore, it is possible to effectively eliminate the banding phenomenon or make the banding phenomenon nearly inconspicuous while avoiding deterioration of image quality.

Further, similar to Aspect 10, since the above respective units can be realized using a computer system provided standard in most of printing apparatuses, the above respective units can be realized economically and easily compared with a case where the above respective units can be realized by making exclusive hardware. Furthermore, upgrade by alterations, improvements, etc. of functions can also be easily performed by rewriting a portion of the program.

Aspect 19:

A computer-readable recording medium of Aspect 19 is a computer-readable recording medium on which the printing program according to any one Aspects 10 to 18 is recorded.

This makes it possible to easily and certainly provide the program according to any one of Aspect 10 to 18 to consumers, such as users, by computer-readable storage media, such as CD-ROMs, DVD-ROMs, FDs, semiconductor chips.

Aspect 20:

Further, according to Aspect 20 of the invention, there is provided a printing method including: acquiring image data having M-value density information (M≧3) for every pixel; acquiring the information on the density unevenness of nozzles which can print different sizes of dots; performing N-valued processing (M>N≧2) on the image data acquired in the acquiring of the image data to generate N-valued data; generating print data from the N-valued data generated in the generating of the N-valued data; and performing printing using the print head based on the print data generated in the generating of the print data. Here, in the generating of the N-valued data, the generation ratios of the different sizes of dots is determined for every predetermined region of the image data acquired in the generating of the image data based on the density unevenness information acquired in the acquiring of the density unevenness information, and N-value processing (M>N≧2) is performed on the image data based on the determined generation ratios.

This, similar to Aspect 1, can effectively eliminate the banding phenomenon, such as a white streak or a dark streak, which is generated by the so-called flight deflection or density unevenness, or make the banding phenomenon nearly inconspicuous. As a result, a high-quality printed material can be obtained.

Further, it is possible to eliminate the banding phenomenon or make the banding phenomenon nearly inconspicuous only in a portion where any density unevenness is being caused, by determining the proper generation frequency of dots having each size for every nozzle according to density unevenness, and changing the mixing ratio of dots with respect to that when there is no density unevenness.

Aspect 21:

The printing method of Aspect 21 is a printing method according to Aspect 20 in which the information on the density unevenness includes the information on a difference value between a density value of a dot formed by each of the nozzles of the print head and an assumed density value.

Since this, similar to Aspect 2, allows different sizes of dots to be more appropriately mixed in a printed image composed of a plurality of dots, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Aspect 22:

The printing method of Aspect 22 is a printing method according to 20 or 21 in which, if it is determined in the generating of the N-valued data that the difference value of the density value of the dot to be formed by each of the nozzles of the print head is greater than a predetermined threshold based on the information on the density unevenness, it is made greater than that when the generation ratio of large-sized dots is not determined.

Since this, similar to Aspect 3, allows different sizes of dots to be more appropriately mixed in a printed image composed of a plurality of dots, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Aspect 23:

The printing method of Aspect 23 is a printing method according to Aspect 22, further including correcting the density value of each pixel of the image data acquired in the acquiring of the image data based on the density unevenness information acquired in the acquiring of the density unevenness information. In the generating of the N-valued data, N-valued processing is performed on the image data corrected in the correcting of the density unevenness to generate N-valued data.

Since this, similar to Aspect 4, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained.

Aspect 24:

The printing method of Aspect 24 is a printing method according to Aspect 22, further including storing dot ratio information which specifies the mixing ratios of the different sizes of dots, selecting a predetermined item of dot ratio information among the dot ratio information stored in the storing of the dot ratio information based on the density unevenness information acquired in the acquiring of the density unevenness information. Here, in the generating of the N-valued data, the generation ratios of the different sizes of dots is determined for every predetermined region of the image data acquired in the acquiring of the image data based on the dot ratio information selected in the selecting of the dot ratio information, and N-valued processing (M>N≧2) is performed on the image data based on the determined generation ratios.

Since this, similar to Aspect 5, allows N-valued processing to be efficiently performed according to a generation ratio specified in the selected dot ratio information, it is possible to more efficiently eliminate the banding phenomenon or make the banding phenomenon nearly inconspicuous.

Aspect 25:

The printing program of Aspect 25 is a printing program according to Aspect 12, correcting the density value of each pixel of the image data acquired in the acquiring of the image data based on the density unevenness information acquired in the acquiring of the density unevenness information, storing dot ratio information which specifies the mixing ratios of the different sizes of dots, and selecting a predetermined item of dot ratio information among the dot ratio information stored in the storing of the dot ratio information based on the density unevenness information acquired in the acquiring of the density unevenness information. Here, in the generating of the N-valued data, the generation ratios of the different sizes of dots is determined for every predetermined region of the image data corrected in the correcting of the density unevenness based on the dot ratio information selected in the selecting of the dot ratio information, and N-valued processing (M>N≧2) is performed on the image data based on the determined generation ratios.

Since this, similar to Aspect 6, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained. Further, since this allows N-valued processing to be efficiently performed according to a generation ratio specified in the selected dot ratio information, it is possible to more efficiently eliminate the banding phenomenon or make the banding phenomenon nearly inconspicuous.

Aspect 26:

The printing method of Aspect 26 is a printing method according to Aspect 23 or 24, in which, in the selecting of the dot ratio information, a predetermined item of dot ratio information is selected from the dot ratio information stored in the storing of the dot ratio information for every plural nozzles including a target nozzle of the print head, and nozzles in the vicinity of the target nozzle.

Since this, similar to Aspect 7, allows the generation ratio (dot mixing ratio) to be determined in units of plural nozzles including a target nozzle of a print head and about two to ten nozzles before and after the target nozzle, it is possible to more effectively eliminate the banding phenomenon resulting from the density unevenness as well as the flight deflection or make the banding phenomenon nearly inconspicuous.

Aspect 27:

The printing method of Aspect 27 is a printing method according to any one of Aspects 23 to 25, in which, in the selecting of the dot ratio information, a predetermined item of dot ratio information is selected from the dot ratio information stored in the storing of the dot ratio information based on the information on a printing position deviation amount of the print head among the density unevenness information acquired in the acquiring of the density unevenness information.

Since this, similar to Aspect 8, allows optimal processing to be performed based on the flight deflection amount (the deviation amount from an assumed printing position), it is possible to effectively eliminate the banding phenomenon or make the banding phenomenon nearly inconspicuous while avoiding deterioration of image quality.

Aspect 28:

The printing method of Aspect 28 is a printing method according to any one of Aspects 13 to 15, in which, in the selecting of the dot ratio information, two or more kinds of dot ratio information is selected from the dot ratio information stored in the storing of the dot ratio information based on the information on a printing position deviation amount of the print head among the density unevenness information acquired in the acquiring of the density unevenness information, and in which, in the generating of the N-valued data, the generation ratios of the different sizes of dots is determined for every predetermined region of the image data based on the two or more kinds of dot ratio information selected in the selecting of the dot ratio information, and N-valued processing (M>N≧2) is performed on the image data based on the determined generation ratios.

Thereby, similar to Aspect 9, in a case in which the banding phenomenon is caused in a plurality of places within one processing region, optimal processing according to the degree in each place can be performed. Therefore, it is possible to effectively eliminate the banding phenomenon or make the banding phenomenon nearly inconspicuous while avoiding deterioration of image quality.

Aspect 29:

Further, according to Aspect 29 of the invention, there is provided an image processing apparatus including: an image data acquiring unit which acquires image data having M-value density information (M≧3) for every pixel; a density unevenness information acquiring unit which acquires information on the density unevenness of the nozzles which can print different sizes of dots; an N-valued data generating unit which performs N-valued processing (M>N≧2) on the image data acquired by the image data acquiring unit to generate N-valued data; a print data generating unit which generates print data from the N-valued data generated by the N-valued data generating unit; and a printing unit which performs printing based on the print data generated by the print data generating unit. Here, the N-valued data generating unit determines the generation ratios of the different sizes of dots for every predetermined region of the image data acquired by the image data acquiring unit based on the density unevenness information acquired by the density unevenness information acquiring unit, and performs N-valued processing (M>N≧2) on the image data based on the determined generation ratios.

This, similar to Aspect 1, makes it possible to generate print data which effectively eliminate the banding phenomenon, such as a white streak or a dark streak, which is generated by the so-called flight deflection or density unevenness, or make the banding phenomenon nearly inconspicuous.

Further, since the above respective units can be realized using a general-purpose computer system, such as a personal computer (PC), the above respective units can be realized economically and easily compared with a case where the above respective units can be realized by making exclusive hardware. Furthermore, upgrade by alterations, improvements, etc. of functions can also be easily performed by rewriting a portion of the program (this is true of the following aspect concerning an image processing apparatus).

Aspect 30:

The image processing apparatus of Aspect 30 is an image processing apparatus according to Aspect 29 in which the information on the density unevenness includes the information on a difference value between a density value of a dot formed by each of the nozzles of the print head and an assumed density value.

Since this, similar to Aspect 2, allows different sizes of dots to be more appropriately mixed in a printed image composed of a plurality of dots, it is possible to generate print data which can effectively eliminate the banding phenomenon, such as a white streak or a dark streak, which is generated by the so-called flight deflection or density unevenness, or make the banding phenomenon nearly inconspicuous.

Aspect 31:

The image processing apparatus of Aspect 31 is an image processing apparatus according to 29 or 30 in which, if it is determined that the difference value of the density value of the dot to be formed by each of the nozzles of the print head is greater than a predetermined threshold based on the information on the density unevenness, the N-valued data generating unit makes it greater than that when the generation ratio of large-sized dots is not determined.

Since this, similar to Aspect 3, allows different sizes of dots to be more appropriately mixed in a printed image composed of a plurality of dots, it is possible to generate print data which can effectively eliminate the banding phenomenon, such as a white streak or a dark streak, which is generated by the so-called flight deflection or density unevenness, or make the banding phenomenon nearly inconspicuous.

Aspect 32:

The image processing apparatus of Aspect 32 is an image processing apparatus according to Aspect 31, further including a density unevenness correcting unit which corrects the density value of each pixel of the image data acquired by the image data acquiring unit based on the density unevenness information acquired by the density unevenness information acquiring unit. The N-valued data generating unit performs N-valued processing on the image data corrected by the density unevenness correcting unit to generate N-valued data.

This, similar to Aspect 4, makes it possible to generate which effectively eliminate the banding phenomenon, such as a white streak or a dark streak, which is generated by the so-called flight deflection or density unevenness, or make the banding phenomenon nearly inconspicuous, and can also reduce deterioration of granularity.

Aspect 33:

The image processing apparatus of Aspect 33 is an image processing apparatus according to Aspect 31, further including a dot ratio information storing unit which stores dot ratio information which specifies the mixing ratios of the different sizes of dots, a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data acquired by the image data acquiring unit based on the dot ratio information selected by the dot ratio information selecting unit, and performs N-valued processing (M>N≧2) on the image data based on the determined generation ratios.

Since this, similar to Aspect 5, allows N-valued processing to be efficiently performed according to a generation ratio specified in the selected dot ratio information, it is possible to generate print data which more efficiently eliminate the banding phenomenon or make the banding phenomenon nearly inconspicuous.

Aspect 34:

The image processing apparatus of Aspect 34 is an image processing apparatus according to Aspect 31, further including a density unevenness correcting unit which corrects the density value of each pixel of the image data acquired by the image data acquiring unit based on the density unevenness information acquired by the density unevenness information acquiring unit, a dot ratio information storing unit which stores dot ratio information which specifies the mixing ratios of the different sizes of dots, and a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data corrected by the density unevenness correcting unit based on the dot ratio information selected by the dot ratio information selecting unit, and performs N-valued processing (M>N≧2) on the image data based on the determined generation ratios.

Since this, similar to Aspect 6, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained. Further, since N-valued processing can be efficiently performed according to a generation ratio specified in the selected dot ratio information, it is possible to generate print data which more efficiently eliminate the banding phenomenon or make the banding phenomenon nearly inconspicuous.

Aspect 35:

The image processing apparatus of Aspect 35 is an image processing apparatus according to Aspect 32 or 33, in which the dot ratio information selecting unit selects a predetermined item of dot ratio information from the dot ratio information stored in the dot ratio information storing unit for every plural nozzles including a target nozzle of the print head, and nozzles the vicinity of the target nozzle.

Since this, similar to Aspect 7, allows the generation ratio (dot mixing ratio) to be determined in units of plural nozzles including a target nozzle of a print head and about two to ten nozzles before and after the target nozzle, it is possible to generate print data which can more effectively eliminate the banding phenomenon resulting from the density unevenness as well as the flight deflection or make the banding phenomenon nearly inconspicuous.

Aspect 36:

The image processing apparatus of Aspect 36 is an image processing apparatus according to any one of Aspects 32 to 34, in which the dot ratio information selecting unit selects a predetermined item of dot ratio information among the dot ratio information stored in the dot ratio information storing unit based on the information on a printing position deviation amount of the print head among the density unevenness information acquired by the density unevenness information acquiring unit.

Since this, similar to Aspect 8, allows optimal processing to be performed based on the flight deflection amount (the deviation amount from an assumed printing position), it is possible to generate print data which effectively eliminate the banding phenomenon or make the banding phenomenon nearly inconspicuous while avoiding deterioration of image quality.

Aspect 37:

The image processing apparatus of Aspect 37 is an image processing apparatus according to any one of Aspects 32 to 34, in which the dot ratio information selecting unit selects two or more kinds of dot ratio information among the dot ratio information stored in the dot ratio information storing unit based on the information on a printing position deviation amount of the print head among the density unevenness information acquired by the density unevenness information acquiring unit, and in which the N-valued data generating unit determines the generation ratios of the different sizes of dots for every predetermined region of the image data based on the two or more kinds of dot ratio information selected by the dot ratio information selecting unit, and performs N-valued processing (M>N≧2) on the image data based on the determined generation ratios.

Thereby, similar to Aspect 9, in a case in which the banding phenomenon is caused in a plurality of places within one processing region, optimal processing according to the degree in each place can be performed. Therefore, it is possible to generate print data which can effectively eliminate the banding phenomenon or make the banding phenomenon nearly inconspicuous while avoiding deterioration of image quality.

Aspect 38:

Further, according to Aspect 38 of the invention, there is provided an image processing program causing a computer to function as: an image data acquiring unit which acquires image data having M-value density information (M≧3) for every pixel; a density unevenness information acquiring unit which acquires information on the density unevenness of the nozzles which can print different sizes of dots; an N-valued data generating unit which performs N-valued processing (M>N≧2) on the image data acquired by the image data acquiring unit to generate N-valued data; and a print data generating unit which generates print data from the N-valued data generated by the N-valued data generating unit. Here, the program causes the N-valued data generating unit to function to determine the generation ratios of the different sizes of dots for every predetermined region of the image data acquired by the image data acquiring unit based on the density unevenness information acquired by the density unevenness information acquiring unit, and to perform N-valued processing (M>N≧2) on the image data based on the determined generation ratios.

This, similar to Aspect 1, makes it possible to generate print data which effectively eliminate the banding phenomenon, such as a white streak or a dark streak, which is generated by the so-called flight deflection or density unevenness, or make the banding phenomenon nearly inconspicuous.

Further, it is possible to eliminate the banding phenomenon or make the banding phenomenon nearly inconspicuous only in a portion where any density unevenness is being caused, by determining the proper generation frequency of dots having each size for every nozzle according to density unevenness, and changing the mixing ratio of dots with respect to that when there is no density unevenness.

Further, similar to Aspect 29, since the above respective units can be realized using a general-purpose computer system, such as a personal computer (PC), the above respective units can be realized economically and easily compared with a case where the above respective units can be realized by making exclusive hardware (This is true of the following aspect concerning an image processing program).

Aspect 39:

The image processing program of Aspect 39 is an image processing program according to Aspect 38 in which the information on the density unevenness includes the information on a difference value between a density value of a dot formed by each of the nozzles of the print head and an assumed density value.

Since this, similar to Aspect 2, allows different sizes of dots to be more appropriately mixed in a printed image composed of a plurality of dots, it is possible to generate print data which can effectively eliminate the banding phenomenon, such as a white streak or a dark streak, which is generated by the so-called flight deflection or density unevenness, or make the banding phenomenon nearly inconspicuous.

Aspect 40:

The image processing program of Aspect 40 is an image processing program according to Aspect 38 or 39, in which, if it is determined that the difference value of the density value of the dot to be formed by each of the nozzles of the print head is greater than a predetermined threshold based on the information on the density unevenness, the N-valued data generating unit makes it greater than that when the generation ratio of a large-sized dot is not determined.

Since this, similar to Aspect 3, allows different sizes of dots to be more appropriately mixed in a printed image composed of a plurality of dots, it is possible to generate print data which can effectively eliminate the banding phenomenon, such as a white streak or a dark streak, which is generated by the so-called flight deflection or density unevenness, or make the banding phenomenon nearly inconspicuous.

Aspect 41:

The image processing program of Aspect 41 is an image processing program according to Aspect 40 causing a computer to function as a density unevenness correcting unit which corrects the density value of each pixel of the image data acquired by the image data acquiring unit based on the density unevenness information acquired by the density unevenness information acquiring unit. The N-valued data generating unit performs N-valued processing on the image data corrected by the density unevenness correcting unit to generate N-valued data.

This, similar to Aspect 4, makes it possible to generate which effectively eliminate the banding phenomenon, such as a white streak or a dark streak, which is generated by the so-called flight deflection or density unevenness, or make the banding phenomenon nearly inconspicuous, and can also reduce deterioration of granularity.

Aspect 42:

The image processing program of Aspect 42 is an image processing program according to Aspect 40, causing a computer to function as a dot ratio information storing unit which stores dot ratio information which specifies the mixing ratios of the different sizes of dots, a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit is adapted to determine the generation ratios of the different sizes of dots for every predetermined region of the image data acquired by the image data acquiring unit based on the dot ratio information selected by the dot ratio information selecting unit, and to perform N-valued processing (M>N>2) on the image data based on the determined generation ratios.

Since this, similar to Aspect 5, allows N-valued processing to be efficiently performed according to a generation ratio specified in the selected dot ratio information, it is possible to generate print data which more efficiently eliminate the banding phenomenon or make the banding phenomenon nearly inconspicuous.

Aspect 43:

The image processing program of Aspect 43 is an image processing program according to Aspect 40, causing a computer to function as density unevenness correcting unit which corrects the density value of each pixel of the image data acquired by the image data acquiring unit based on the density unevenness information acquired by the density unevenness information acquiring unit, a dot ratio information storing unit which stores dot ratio information which specifies the mixing ratios of the different sizes of dots, and a dot ratio information selecting unit which selects a predetermined item of dot ratio information among the dot ratio information stored in the dot ratio information storing unit based on the density unevenness information acquired by the density unevenness information acquiring unit. Here, the N-valued data generating unit determines the generation ratios of the different sizes of dots for every predetermined region of the image data corrected by the density unevenness correcting unit based on the dot ratio information selected by the dot ratio information selecting unit, and performs N-valued processing (M>N≧2) on the image data based on the determined generation ratios.

Since this, similar to Aspect 6, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained. Further, since N-valued processing can be efficiently performed according to a generation ratio specified in the selected dot ratio information, it is possible to generate print data which more efficiently eliminate the banding phenomenon or make the banding phenomenon nearly inconspicuous.

Aspect 44:

The image processing program of Aspect 44 is an image processing program according to Aspect 41 or 42, in which the dot ratio information selecting unit selects a predetermined item of dot ratio information from the dot ratio information stored in the dot ratio information storing unit for every plural nozzles including a target nozzle of the print head, and nozzles in the vicinity of the target nozzle.

Since this, similar to Aspect 7, allows the generation ratio (dot mixing ratio) to be determined in units of plural nozzles including a target nozzle of a print head and about two to ten nozzles before and after the target nozzle, it is possible to generate print data which can more effectively eliminate the banding phenomenon resulting from the density unevenness as well as the flight deflection or make the banding phenomenon nearly inconspicuous.

Aspect 45:

The image processing program of Aspect 45 is an image processing program according to any one of Aspects 41 to 43, in which the dot ratio information selecting unit selects a predetermined item of dot ratio information among the dot ratio information stored in the dot ratio information storing unit based on the information on a printing position deviation amount of the print head among the density unevenness information acquired by the density unevenness information acquiring unit.

Since this, similar to Aspect 8, allows optimal processing to be performed based on the flight deflection amount (the deviation amount from an assumed printing position), it is possible to generate print data which effectively eliminate the banding phenomenon or make the banding phenomenon nearly inconspicuous while avoiding deterioration of image quality.

Aspect 46:

The image processing program of Aspect 46 is an image processing program according to any one of Aspects 41 to 43, in which the dot ratio information selecting unit selects two or more kinds of dot ratio information among the dot ratio information stored in the dot ratio information storing unit based on the information on a printing position deviation amount of the print head among the density unevenness information acquired by the density unevenness information acquiring unit, and in which the N-valued data generating unit determines the generation ratios of the different sizes of dots for every predetermined region of the image data based on the two or more kinds of dot ratio information selected by the dot ratio information selecting unit, and performs N-valued processing (M>N≧2) on the image data based on the determined generation ratios.

Thereby, similar to Aspect 9, in a case in which the banding phenomenon is caused in a plurality of places within one processing region, optimal processing according to the degree in each place can be performed. Therefore, it is possible to generate print data which can effectively eliminate the banding phenomenon or make the banding phenomenon nearly inconspicuous while avoiding deterioration of image quality.

Aspect 47:

A computer-readable recording medium of Aspect 47 is a computer-readable recording medium on which the image processing program according to any one Aspects 38 to 46 is recorded.

This makes it possible to easily and certainly provide the image processing program according to any one of Aspect 38 to 46 to consumers, such as users, by a computer-readable storage media, such as CD-ROMs, DVD-ROMs, FDs, and semiconductor chips.

Aspect 48:

Further, according Aspect 48 of the invention, there is provided an image processing method including: acquiring image data having M-value density information (M≧3) for every pixel; acquiring the information on the density unevenness of nozzles which can print different sizes of dots; performing N-valued processing (M>N≧2) on the image data acquired in the acquiring of the image data to generate N-valued data; and generating print data from the N-valued data generated in the generating of the N-valued data. Here, in the generating of the N-valued data, the generation ratios of the different sizes of dots is determined for every predetermined region of the image data acquired in the generating of the image data based on the density unevenness information acquired in the acquiring of the density unevenness information, and N-value processing (M>N≧2) is performed on the image data based on the determined generation ratios.

This, similar to Aspect 1, makes it possible to generate print data which effectively eliminate the banding phenomenon, such as a white streak or a dark streak, which is generated by the so-called flight deflection or density unevenness, or make the banding phenomenon nearly inconspicuous.

Further, it is possible to eliminate the banding phenomenon or make the banding phenomenon nearly inconspicuous only in a portion where any density unevenness is being caused, by determining the proper generation frequency of dots having each size for every nozzle according to density unevenness, and changing the mixing ratio of dots with respect to that when there is no density unevenness.

Aspect 49:

The image processing method of Aspect 49 is an image processing method according to Aspect 48 in which the information on the density unevenness includes the information on a difference value between a density value of a dot formed by each of the nozzles of the print head and an assumed density value.

Since this, similar to Aspect 2, allows different sizes of dots to be more appropriately mixed in a printed image composed of a plurality of dots, it is possible to generate print data which can effectively eliminate the banding phenomenon, such as a white streak or a dark streak, which is generated by the so-called flight deflection or density unevenness, or make the banding phenomenon nearly inconspicuous.

Aspect 50:

The image processing method of Aspect 50 is an image processing method according to 48 or 49 in which, if it is determined in the generating of the N-valued data that the difference value of the density value of the dot to be formed by each of the nozzles of the print head is greater than a predetermined threshold based on the information on the density unevenness, it is made greater than that when the generation ratio of large-sized dots is not determined.

Since this, similar to Aspect 3, allows different sizes of dots to be more appropriately mixed in a printed image composed of a plurality of dots, it is possible to generate print data which can effectively eliminate the banding phenomenon, such as a white streak or a dark streak, which is generated by the so-called flight deflection or density unevenness, or make the banding phenomenon nearly inconspicuous.

Aspect 51:

The image processing method of Aspect 51 is an image processing method according to Aspect 50, further including correcting the density value of each pixel of the image data acquired in the acquiring of the image data based on the density unevenness information acquired in the acquiring of the density unevenness information. In the generating of the N-valued data, N-valued processing is performed on the image data corrected in the correcting of the density unevenness to generate N-valued data.

This, similar to Aspect 4, makes it possible to generate which effectively eliminate the banding phenomenon, such as a white streak or a dark streak, which is generated by the so-called flight deflection or density unevenness, or make the banding phenomenon nearly inconspicuous, and can also reduce deterioration of granularity.

Aspect 52:

The image processing method of Aspect 52 is an image processing method according to Aspect 50, further including storing dot ratio information which specifies the mixing ratios of the different sizes of dots, selecting a predetermined item of dot ratio information among the dot ratio information stored in the storing of the dot ratio information based on the density unevenness information acquired in the acquiring of the density unevenness information. Here, in the generating of the N-valued data, the generation ratios of the different sizes of dots is determined for every predetermined region of the image data acquired in the acquiring of the image data based on the dot ratio information selected in the selecting of the dot ratio information, and N-valued processing (M>N≧2) is performed on the image data based on the determined generation ratios.

Since this, similar to Aspect 5, allows N-valued processing to be efficiently performed according to a generation ratio specified in the selected dot ratio information, it is possible to generate print data which more efficiently eliminate the banding phenomenon or make the banding phenomenon nearly inconspicuous.

Aspect 53:

The image processing method of Aspect 53 is an image processing method according to Aspect 50, correcting the density value of each pixel of the image data acquired in the acquiring of the image data based on the density unevenness information acquired in the acquiring of the density unevenness information, storing dot ratio information which specifies the mixing ratios of the different sizes of dots, and selecting a predetermined item of dot ratio information among the dot ratio information stored in the storing of the dot ratio information based on the density unevenness information acquired in the acquiring of the density unevenness information. Here, in the generating of the N-valued data, the generation ratios of the different sizes of dots is determined for every predetermined region of the image data corrected in the correcting of the density unevenness based on the dot ratio information selected in the selecting of the dot ratio information, and N-valued processing (M>N≧2) is performed on the image data based on the determined generation ratios.

Since this, similar to Aspect 6, can effectively eliminate the banding phenomenon, such as a white streak or a dark streak, which is generated by the so-called flight deflection or density unevenness, or make the banding phenomenon nearly inconspicuous, and can also reduce deterioration of granularity, a higher-quality printed material can be obtained. Further, since N-valued processing can be efficiently performed according to a generation ratio specified in the selected dot ratio information, it is possible to generate print data which more efficiently eliminate the banding phenomenon or make the banding phenomenon nearly inconspicuous.

Aspect 54:

The image processing method of Aspect 54 is an image processing method according to Aspect 51 or 52, in which, in the selecting of the dot ratio information, a predetermined item of dot ratio information is selected from the dot ratio information stored in the storing of the dot ratio information for every plural nozzles including a target nozzle of the print head, and nozzles in the vicinity of the target nozzle.

Since this, similar to Aspect 7, allows the generation ratio (dot mixing ratio) to be determined in units of plural nozzles including a target nozzle of a print head and about two to ten nozzles before and after the target nozzle, it is possible to generate print data which can more effectively eliminate the banding phenomenon resulting from the density unevenness as well as the flight deflection or make the banding phenomenon nearly inconspicuous.

Aspect 55:

The image processing method of Aspect 55 is an image processing method according to any one of Aspects 51 to 53, in which, in the selecting of the dot ratio information, a predetermined item of dot ratio information is selected from the dot ratio information stored in the storing of the dot ratio information based on the information on a printing position deviation amount of the print head among the density unevenness information acquired in the acquiring of the density unevenness information.

Since this, similar to Aspect 8, allows optimal processing to be performed based on the flight deflection amount (the deviation amount from an assumed printing position), it is possible to generate print data which effectively eliminate the banding phenomenon or make the banding phenomenon nearly inconspicuous while avoiding deterioration of image quality.

Aspect 56:

The image processing method of Aspect 56 is an image processing method according to any one of Aspects 51 to 53, in which, in the selecting of the dot ratio information, two or more kinds of dot ratio information is selected from the dot ratio information stored in the storing of the dot ratio information based on the information on a printing position deviation amount of the print head among the density unevenness information acquired in the acquiring of the density unevenness information, and in which, in the generating of the N-valued data, the generation ratios of the different sizes of dots is determined for every predetermined region of the image data based on the two or more kinds of dot ratio information selected in the selecting of the dot ratio information, and N-valued processing (M>N≧2) is performed on the image data based on the determined generation ratios.

Thereby, similar to Aspect 9, in a case in which the banding phenomenon is caused in a plurality of places within one processing region, optimal processing according to the degree in each place can be performed. Therefore, it is possible to generate print data which can effectively eliminate the banding phenomenon or make the banding phenomenon nearly inconspicuous while avoiding deterioration of image quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings.

Figure 1:
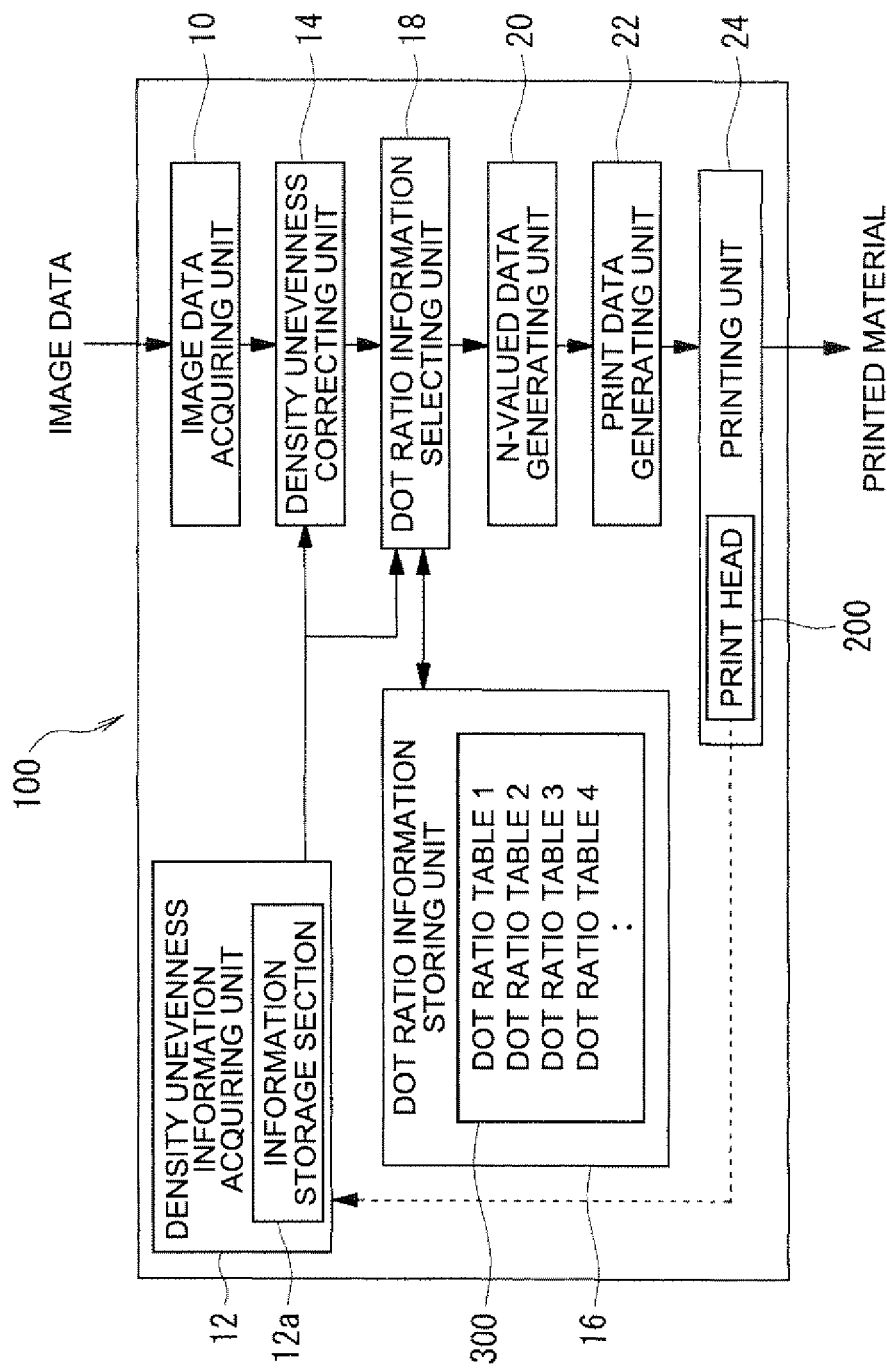
FIG. 1 is a functional block diagram showing a first embodiment of a printing apparatus according to the invention.

FIGS. 1 and 26 show a printing apparatus 100, a printing program, a printing method, an image processing apparatus, an image processing program, an image processing method, and a computer-readable recording medium according to a first embodiment of the invention.

FIG. 1 is a functional block diagram showing the first embodiment of the printing apparatus 100 according to the invention.

As shown in FIG. 1, the printing apparatus 100 includes a print head 200 in which a plurality of nozzles which can print different sizes of dots are arranged, an image data acquiring unit 10 which acquires image data having M-value density information (M≧3) for every pixel, a density unevenness information acquiring unit 12 which acquires information on the density unevenness of the nozzles of the print head 200, a density unevenness correcting unit 14 which corrects the density value of each pixel of the image data acquired by the image data acquiring unit 10 based on the density unevenness information acquired by the density unevenness information acquiring unit 12, a dot ratio information storing unit 16 which stores a plurality of dot ratio tables 300 which specifies the mixing ratio (dot generation ratio of each size) of each of the different sizes of dots, a dot ratio information selecting unit 18 which selects a predetermined dot ratio table among the dot ratio tables 300 stored in the dot ratio information storing unit 16, an N-valued data generating unit 20 which performs N-valued processing (M>N≧2) on the image data corrected by the density unevenness correcting unit 14 to generates N-valued data, a print data generating unit 22 which generates print data from the N-valued data generated by the N-valued data generating unit 20, and an ink-jet type printing unit 24 which performs printing using the print head 200 based on the print data generated by the print data generating unit 22.

First, the print head 200 will be described.

Figure 3:
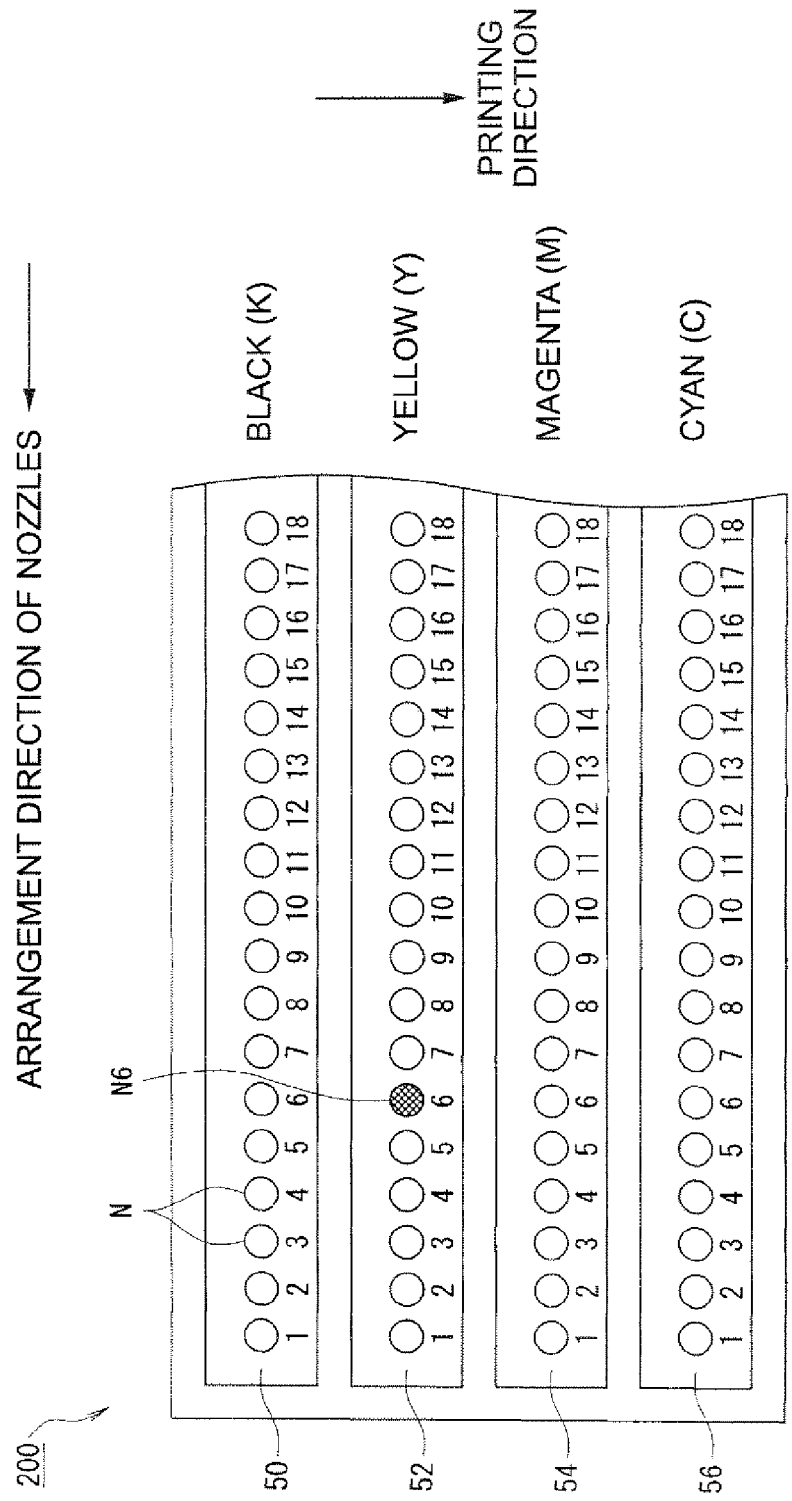
FIG. 3 is a partially enlarged bottom view showing the structure of a print head according to the invention.
Figure 4:
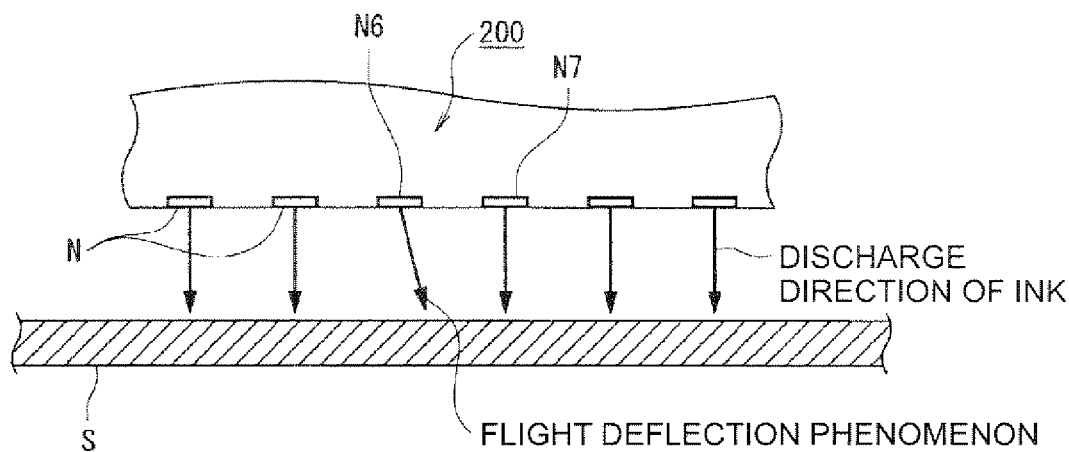
FIG. 4 is a partially enlarged side view showing the characteristics (flight deflection) of the print head according to the invention.

FIG. 3 is a partially enlarged bottom view showing the structure of the print head 200, and FIG. 4 is a partially enlarged side view showing the structure of the print head 200.

As shown in FIG. 3, the print head 200 has a long structure extending in the width direction of a print sheet to be used for a so-called line-head type printer, and is configured by integrally arranging the following four nozzle modules 50, 52, 54, and 56 such that they are stacked in multiple stages in a printing direction (perpendicular to a nozzle arrangement direction). The above four nozzles includes a black nozzle module 50 in which a plurality of (eighteen in FIG. 3) nozzles N which exclusively discharge black (K) ink are arranged linearly, a yellow nozzle module 52 in which a plurality of nozzles N which exclusively discharge yellow (Y) ink are arranged linearly in the same direction, a magenta nozzle module 54 in which a plurality of nozzles N which exclusively discharge magenta (M) ink are arranged linearly in the same direction, and a cyan nozzle module 56 in which a plurality of nozzles N which exclusively discharge cyan (C) ink are arranged linearly in the same direction. In addition, only black (K) ink may be used in the case of a print head for the purpose of monochrome printing, and six or seven colors of ink to which light magenta, light cyan, etc., are added may be used in the case of a print head which targets a high-quality image.

FIG. 4 shows, for example, the black nozzle module 50 that is one of the four nozzle modules 50, 52, 54, and 56 from the side (printing direction), and shows a state (printing position deviation) where ink is discharged in an oblique direction from a sixth nozzle N6 from the left due to the occurrence of a flight deflection phenomenon by the sixth nozzle N6 and thereby a dot is printed toward a dot which is discharged by the adjacent normal nozzle N7.

Figure 5:
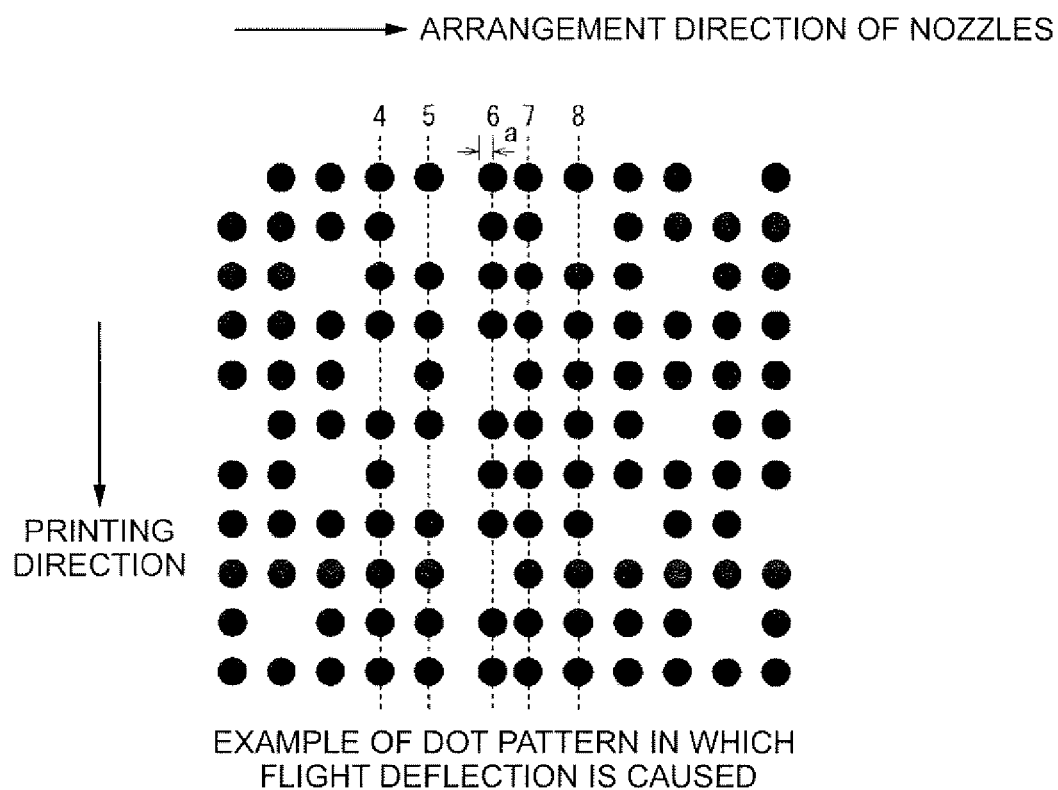
FIG. 5 is a conceptual diagram showing an example of a dot pattern formed by the flight deflection phenomenon of one nozzle.
Figure 6:
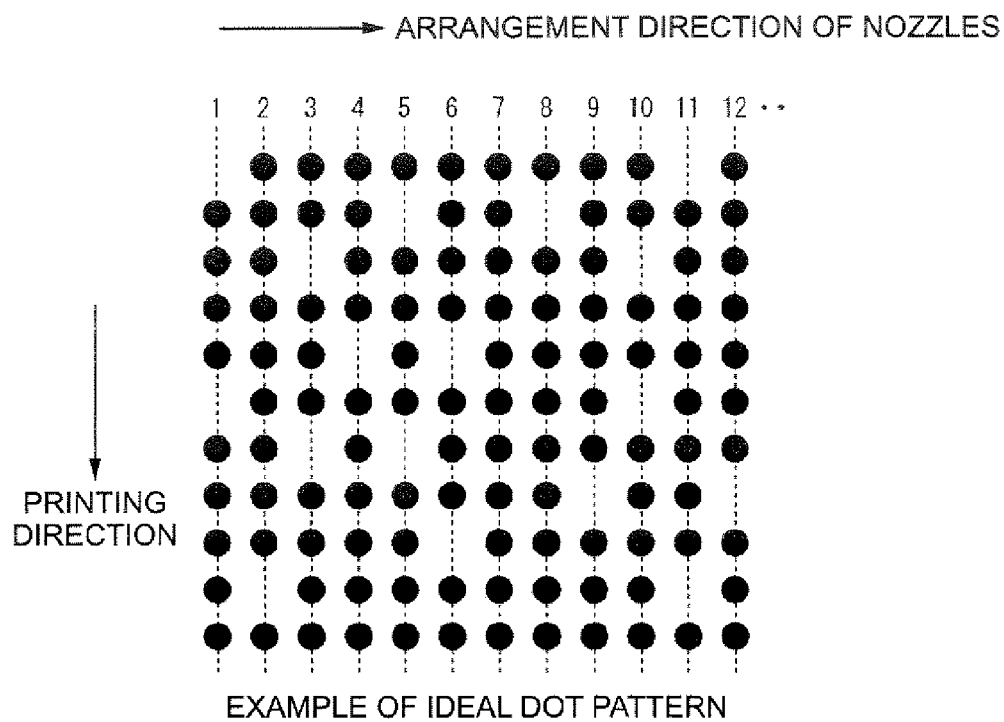
FIG. 6 is a conceptual diagram showing an example of an ideal dot pattern in which the flight deflection phenomenon is not caused.

Accordingly, when printing is performed using the black nozzle module 50, as shown in FIG. 6, all dots are printed in their regular printing positions in a state where the flight deflection does not occur (ideal dot pattern). In contrast, as shown in FIG. 5, for example, if the sixth nozzle N6 from the left causes the flight deflection phenomenon, a dot may be printed in a state where the dot printing position deviates toward the adjacent normal nozzle N7 by a distance "a" from a desired printing position.

Further, in the print head 200 having such a structure, circular dots can be printed on a white print sheet by discharging the inks supplied into ink chambers (not shown) which are provided in the nozzles N1, N2, N3, . . . respectively, from the nozzles N1, N2, . . . , and N3, . . . by piezoelectric elements, such as piezo actuators, which are provided in the ink chambers, respectively, and different sizes of dots can be printed for each of the nozzles N1, N2, and N3, . . . by controlling the voltages applied to the piezoelectric elements in multiple stages to control the discharge amount of the ink from each ink chamber. Further, a voltage may be serially applied to a nozzle in two steps for a short time so that one dot may be formed by combining two discharges on a print sheet. In this case, it is possible to discharge a large dot following a small dot using a different discharge speed according to the size of a dot to make ink reach almost the same position on the sheet to form one still larger dot. Printing which is performed for the purpose of realizing one dot is called one dot printing.

In the print head 200 having such a structure, a normal amount of ink may not be discharged due to a variation in the size of the nozzle holes of the nozzles N1, N2, N3, . . . , and a difference in the supply pressure of ink during the manufacturing process in addition to the flight deflection phenomenon as described above.

Figure 7:
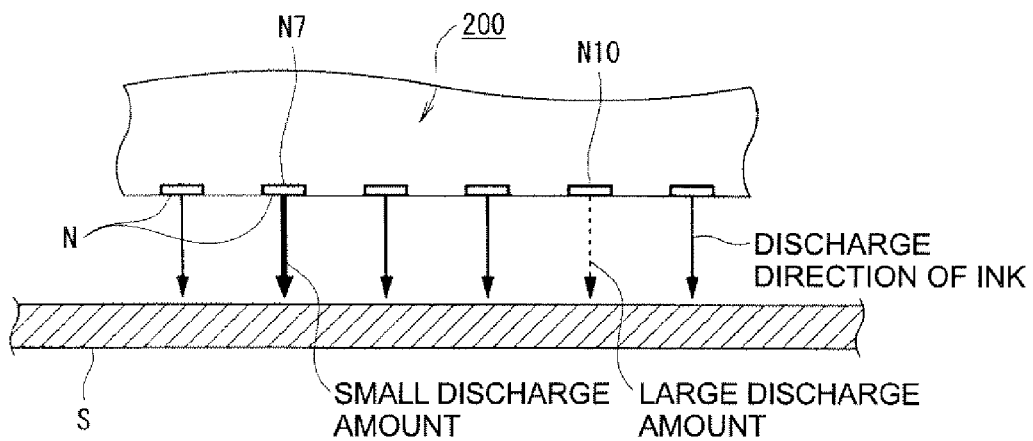
FIG. 7 is a partially enlarged side view showing the characteristics (density unevenness) of the print head according to the invention.

For example, in the case of the print head 200, as shown in FIG. 3, irrespective of being controlled so that the nozzles N6 to N11 of a certain nozzle module may discharge the same ink discharge amount (the same dot size), as shown in FIG. 7, the nozzle N7 may discharge a larger amount of ink than the discharge amount of a normal nozzle, such as the nozzle N6 (large discharge amount). In contrast, the nozzle N10 may discharge a smaller amount of ink than the discharge amount of a normal nozzle (small discharge amount).

Figure 8:
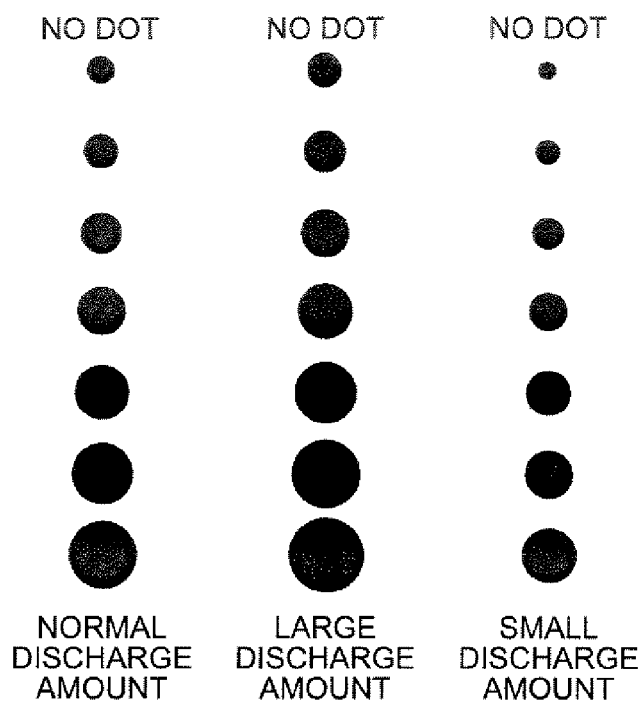
FIG. 8 is an explanatory view showing the relationship between the ink discharge amount of a print head, and dot size.

When a dot is printed using such a print head 200, in a nozzle having a larger amount of discharge than a specified value (large discharge amount), the size of a dot to be printed may become greater than a desired dot size. In contrast, in a nozzle having a smaller amount of discharge than a specified value (small discharge amount), the size of a dot to be printed may be smaller than a desired dot size. That is, for example, as shown in FIG. 8, in a pattern in which eight different sizes of dots including "No Dot" are printed separately, a dot which is one or two sizes larger than the size of a dot formed by a normal nozzle is formed in a nozzle having a larger amount of discharge than the normal nozzle, and a dot which is one or two sizes smaller than the size of a dot formed by a normal nozzle is formed in a nozzle having a smaller amount of discharge than the normal nozzle.

Figure 9:
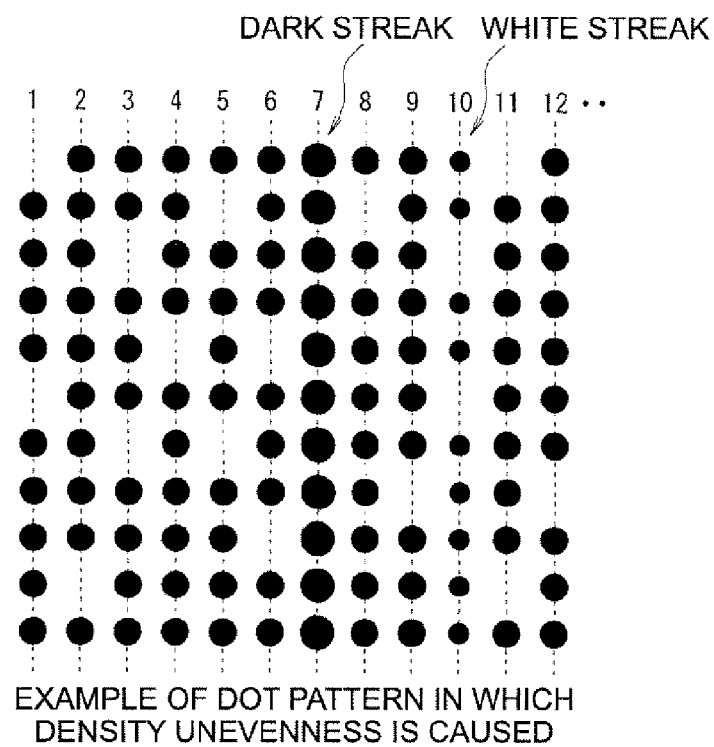
FIG. 9 is a conceptual diagram showing an example of a dot pattern formed by a density unevenness phenomenon.

As a result, irrespective of the fact that the print head 200 is controlled to print a dot pattern with a uniform size as shown in FIG. 6, a dot pattern as shown in FIG. 9 is printed, and a dot line corresponding to the nozzle N7 becomes conspicuous as a dark streak, or a space appears in a dot line corresponding to the nozzle N10, and becomes conspicuous as a white streak, which results in poor printing due to the density unevenness.

In addition, although the dot pattern of FIG. 9 is formed using only dots having one kind of size in order to make the explanation easy to understand, it is needless to say that troubles are caused even in a dot pattern in which dots having a plurality of sizes and dots having a plurality of colors are mixed like actual colors or actual monochrome printed materials. Further, although an example in which a variation is randomly caused in the ink discharge amount is shown in FIG. 7 or FIG. 9, in general, such a variation in ink discharge amount is easily caused in the nozzles located in the vicinity of an end or a central part of a print head. Thus, there is a tendency that a prescribed amount or more of ink is discharged from these nozzles in the vicinity of the end of the print head and thereby a prescribed size or more of dots are printed, and a prescribed amount or less of ink is discharged from the nozzles in the vicinity of the central part of the line head and thereby a prescribed size or less of dots are easily printed.

Further, although it is considered that the characteristics of such a print head 200 may be fixed to some degree during the manufacturing process, a change after manufacture is relatively rare except for the poor discharge caused by ink clogging, it is known that ink discharge amount will differ for every nozzle due to various factors, such as a change in the viscosity of ink caused by deterioration with the lapse of time, etc., a change in the diameter of nozzle holes, or a change in the operation of piezoelectric elements. Further, as described above, the term "dot" in the present embodiment is a base unit representing characters and figures of a printed material, and means a region where ink has reached a recording medium by one dot printing.

Next, the image data acquiring unit 10 is adapted to acquire M-value image data for printing sent from a printing instruction unit (not shown), such as a personal computer (PC) and a printer server, which is connected with the printing apparatus 100, over a network etc., or to provide a function which directly reads in and acquires image data from an image (data) reader, such as a scanner, a CD-ROM drive, etc. which are not shown. Further, if the image data acquired is, for example, image data in which the gray-scale levels (density value) of each color (R, G, B) per pixel are expressed by 8 bits (0-255), the image data acquiring unit is adapted to simultaneously exhibit a function which performs color conversion processing on the image data to convert the image data into multi-valued CMYK data (in the case of four colors) corresponding to each ink of the print head 200.

Next, although the density unevenness information acquiring unit 12 provides a function which acquires information on the density unevenness of the nozzles of such a print head 200, the information on "flight deflection" of nozzles as described above in addition to the "density unevenness" associated with poor ink discharge amount is also included in this information on the density unevenness.

Specifically, this information on "density unevenness" includes at least the information on whether there is any nozzle which causes the flight deflect phenomenon, or in a certain case, the information which specifies nozzles and indicates the amount of the flight deflection, in addition to the information on whether there is any nozzle which causes density unevenness without printing a prescribed size of dots, and the information which specifies nozzles and indicates the degree of the density unevenness, all of which will be described in detail. In addition, the "information on density unevenness" acquired by the density unevenness information acquiring unit 12 is acquired and updated, and is stored in an information storage section 12a composed of a rewritable RAM, etc. so as to be readable, during manufacture of the printing apparatus 100 according to the invention or at an appropriate time after manufacture.

Next, the density unevenness correcting unit 14 is adapted to provide a function which corrects the density value of each pixel of the image data acquired by the image data acquiring unit 10 particularly based on the information on the "density unevenness" associated with poor ink discharge amount among the density unevenness information acquired by the density unevenness information acquiring unit 12.

For example, in a case in which the density value of each pixel of the image data acquired by the image data acquiring unit 10 is expressed by 8-bit 256 gray-scale levels, and irrespective of the fact that the density value of a certain pixel of the pixels is "210", poor printing discharge ("small" discharge amount) of a nozzle corresponding to the pixel allows printing of only a dot whose size to be actually printed by the nozzle is equivalent to a density value "126," the density value of the pixel is corrected to a higher value so that a dot having a normal size corresponding to an original density value may be printed. In contrast, in a case in which the density value of each pixel of the image data acquired by the image data acquiring unit 10 is expressed by 8-bit 256 gray-scale levels, and irrespective of the fact that the density value of a certain pixel of the pixels is "126", poor printing discharge ("large" discharge amount) of a nozzle corresponding to the pixel allows printing of a dot whose size to be actually printed by the nozzle is equivalent to a density value "256," the density value of the pixel is corrected to a lower value so that a dot having a normal size corresponding to an original density value may be printed.

Figure 10:
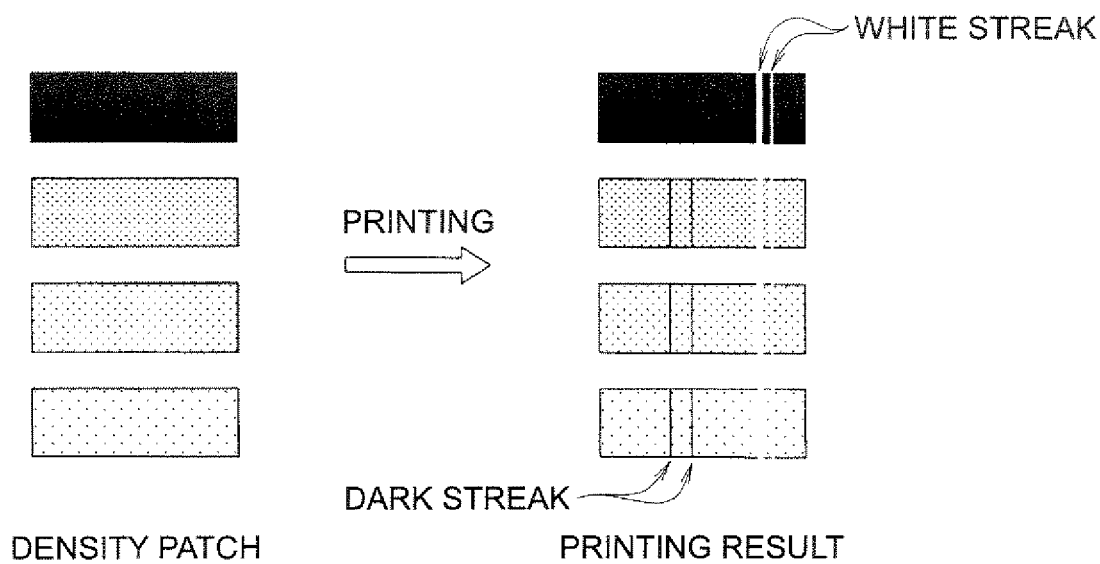
FIG. 10 is an explanatory view showing an example of the density unevenness information acquisition processing by a density unevenness information acquiring unit.
Figure 11:
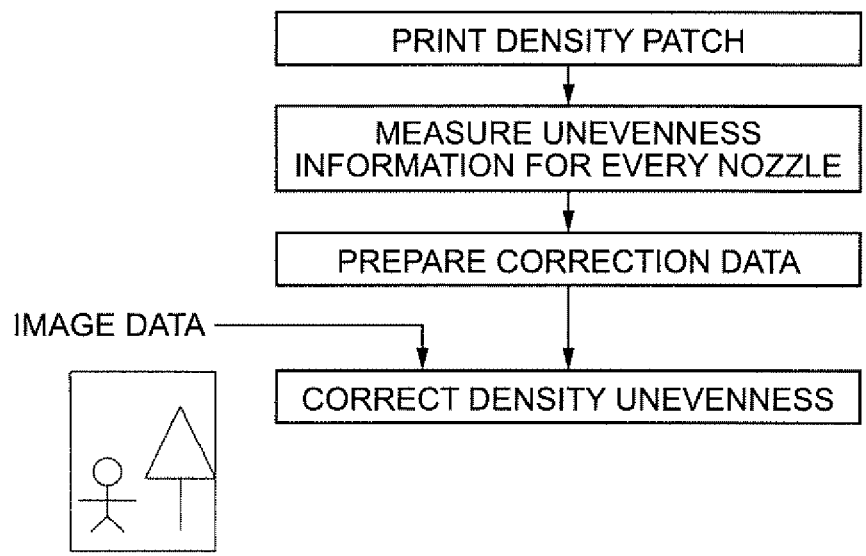
FIG. 11 is an explanatory view showing an example of the density unevenness correction processing by a density unevenness correcting unit.

FIGS. 10 and 11 show an example of the density unevenness correction processing by the density unevenness correcting unit 14, and the density unevenness information acquisition processing by the density unevenness information acquiring unit 12.

Specifically, as for the density unevenness information acquisition processing by the density unevenness information acquiring unit 12, for example, as shown in FIG. 10, several kinds of density patches (density data) having different densities are used, this density patch is then actually printed on a printing medium using the above-mentioned print head 200, and the degree of the density unevenness for every nozzle is then measured by reading the printing result using an optical density reader, such as a scanner, so that the density unevenness information can be acquired. Also, as for the density unevenness correction processing by the density unevenness correcting unit 14, the correction data for every nozzle is prepared based on the density unevenness information, and the density value of each pixel of the image data acquired by the image data acquiring unit is then adjusted based on the correction data so that density unevenness can be corrected.

Next, the dot ratio information storing unit 16 is adapted to provide a function which stores (preserves) a plurality of dot ratio tables 300 (dot ratio tables 1, 2, 3, . . . ) which specify the mixing ratio of each of the different sizes of dots according to the density value of the image data. Specifically, electronic information is recorded on electromagnetic recording media, such as auxiliary memories (storages), such as RAMs (main storages) and HDDs (hard disk drives) of a computer system so that it can be read out freely.

Figure 12A:
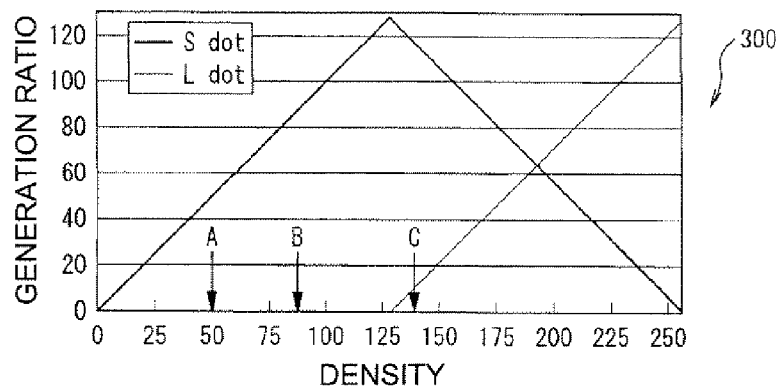
FIGS. 12A to 12C are views showing an example of a dot conversion table.
Figure 12B:
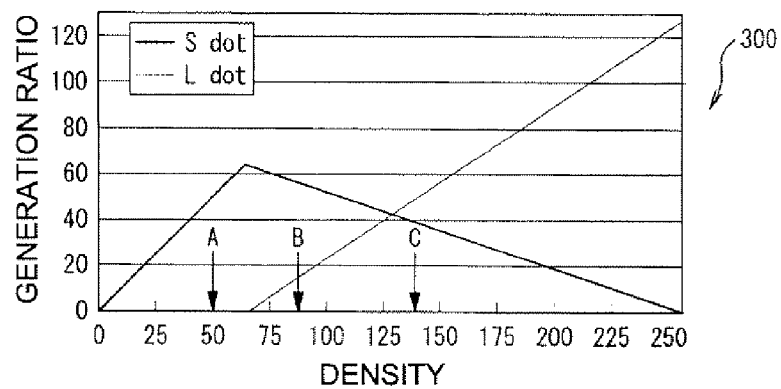
Figure 12C:
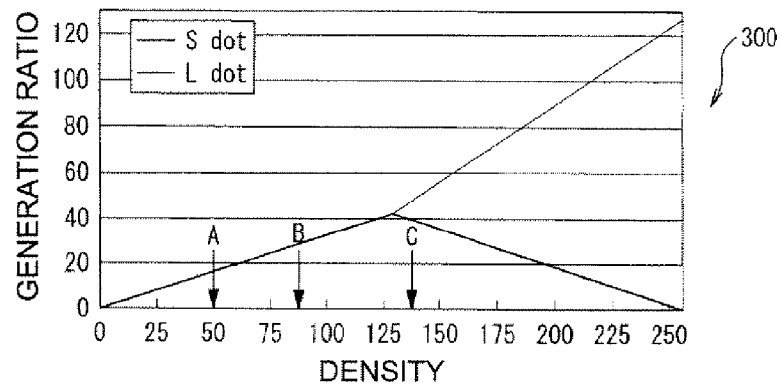

FIGS. 12A to 12C show examples of the dot ratio tables 300, respectively.

As shown in these figures, each of these dot ratio tables 300 shows the relationship (mixing ratio) between the generation ratio (y-axis) of two kinds of dots including a "small dot (Sdot)" and a "large dot (Ldot)" and the density (x-axis). Specifically, each dot ratio table specifies that, based on the average density of pixels in a region to be processed, "small dots" are preferentially generated when the average density is low, and as the average density rises, the generation ratio of "small dots" becomes low and the generation ratio of "large dots" becomes high.

First, the dot ratio table 300 shown in FIG. 12A specifies obtaining an image with graininess, i.e., a feeling of roughness, is minimized by utilizing the "small dots (Sdot)" to the maximum.

That is, in the dot ratio table 300 of FIG. 12A, when the average densities of the pixels in a region to be processed are A and B, only "small dots" are generated, and when the average density in the vicinity of a portion where the average density exceeds near "125 (8 bits, 256 gray-scale levels)" is C, "large dots" are generated along with "small dots" so as to express the density of the region.

Meanwhile, the dot ratio table 300 of FIG. 12B is a table which specifies dot mixing ratios in a case in which banding is caused in a region to be processed. That is, in the dot ratio table 300 shown in FIG. 12B, when the average density of the pixels in a region to be processed is A, only "small dots" are generated similarly to the dot ratio table 300 of FIG. 12A. However, when the average density is B, "large dots" already begin to be generated, and when the average density is C, the generation ratio of large dots becomes almost the same as that of "small dots" so as to express the density of the region.

Moreover, the dot ratio table 300 of FIG. 12C is a table which specifies dot mixing ratios in a case in which greater banding is caused in a region to be processed.

Moreover, in the dot ratio table 300 of FIG. 12C, when the average densities of the pixels in a region to be processed are A and B, "small dots" and "large dots" are simultaneously generated in the same generation ratio to express the density of the region. However, when the average density of the pixels in a region to be processed is C, the generation ratio of "large dots" becomes higher than that of "small dots," so as to express the density of the region. Although the feeling of roughness increases with a shift from FIG. 12B toward FIG. 12C, it is easy to avoid characteristics inherent in nozzles, such as density unevenness and banding, because large dots are easily generated.

Figures 14, 15:
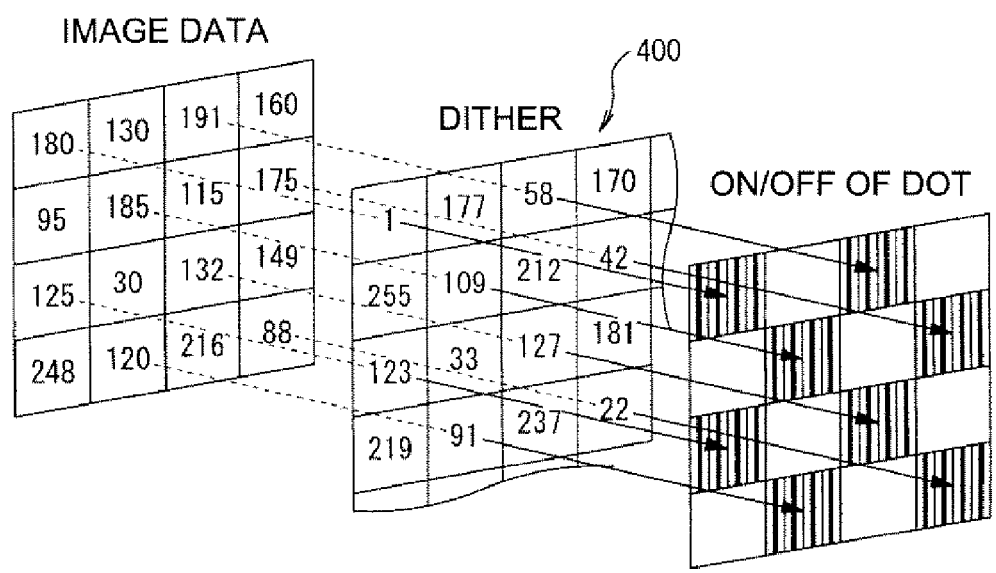
FIG. 14 is a view showing an example of a dither matrix used in N-valued processing.
FIG. 15 is an explanatory view showing a dither method used in the N-valued processing.

Here, as for a method of determining the region of the image data to be processed, the region is not particularly limited as long as it includes a dot generated by a nozzle which causes density unevenness and flight deflection, and may be a unit of 2 to 10 pixels including the problem nozzle and nozzles before and after the problem nozzle. For example, the region may be only a target nozzle, or as shown in FIG. 14, it may be a unit (region) of about 4×4 (pixel) size (substantially four lines), and may be a unit (region) greater than that size.

Next, the dot ratio information selecting unit 18 is adapted to provide a function which selects a predetermined dot ratio table 300 among the plurality of dot ratio tables 300 stored in the dot ratio information storing unit 16 based on the density unevenness information acquired by the density unevenness information acquiring unit 12.

Here, although a criterion for the selection of the dot ratio tables 300 by the dot ratio information selecting unit 18 is not particularly limited, for example, one or two kinds of combinations are used based on density unevenness information, such as a correction amount of density unevenness and flight deflection amount, or a dot ratio table 300 optimal for every nozzle is selected and used. Concrete examples thereof will be described below in detail.

Next, although the N-valued data generating unit 20 is adapted to provide as its fundamental function a function which performs N-valued processing (N≧2) to each pixel of the image data corrected by the density unevenness correcting unit 14 to generate N-valued image data based on a typical binarization processing method which is generally used in the field of image processing, such as a "dither method", the N-valued data generating unit 20 is adapted to perform N-valued processing (M>N≧2) on the image data corrected by the density unevenness correcting unit 14 so that it may become a dot mixing ratio specified in a dot ratio table 300 selected by the dot ratio information selecting unit 18.

FIG. 14 shows an example of a dither matrix (dither table) 400 used in the binarization performed by the N-valued data generating unit 20. As shown in this figure, each grid of the dither matrix 400 corresponds to each pixel of the image data to be processed, and as shown in FIG. 15, binarization processing of the multi-valued image data is performed by comparing the density value of each pixel of the image data with the numerical value (threshold) of each grid of the dither matrix 400, and performing binarization determination (ON/OFF of a dot) that, if the value of a gray image is greater than the numerical value, black is selected (dotting) and, if the value of the gray image is smaller than the numerical value, white is selected (non-dotting).

Furthermore, when the above-mentioned dot ratio tables 300 are selected for every nozzle of the print head 200 in such fundamental binarization processing, the N-valued data generating unit 20 is adapted to perform N-valued processing for every processing region so that it may become a dot mixing ratio specified in the dot ratio tables 300.

Therefore, this N-valued data generating unit 20 converts a density value using a dot ratio table 300 selected by the dot ratio information selecting unit 18, and compares the value with the dither matrix 400.

Specifically, L_val=L_Conv (pixel density) and S_val=S_Conv (pixel density) are performed for every pixel. Here, the L_Conv means the generation frequency of the large dots (Ldot) in the dot ratio tables 300. For example, in a case in which the dot ratio table 300 of FIG. 12A is used, the L_Conv always becomes "0" in an input density of "0" to "127" and the L_Conv becomes a value which rises linearly from "0" to "128" in an input density of "127" to "255." Meanwhile, the S_Conv means the generation frequency of the small dots (Sdot). Similarly, in a case in which the dot ratio table 300 of FIG. 12A is used, the S_Conv becomes a function which rises linearly from "0" to "127" in an input density of "0" to "127." However, since threshold processing is performed even if the same dither matrix 400 as the dither matrix 400 used for the large dots is used, a situation occurs that a small dot is not printed in the position which a large dot has been generated, even if a small dot is set to ON. Thus, the dot mixing ratio of the dot ratio tables 300 can be kept by outputting to S_Conv a value obtained by summing up the generation ratio of small dots and the generation ratio of large dots.

In addition, in a case in which the maximum printing amount of dots is set to "128" and the density maximum value is set to "255" in performing conversion based on the generation ratio from density, the consistency of data can be maintained by doubling a converted value based on the dot ratio tables 300 from the density.

Next, the print data generating unit 22 provides a function which sets a corresponding dot for every pixel of the N-valued data to which N-valued processing has been performed to generate the data for printing which can be used in the ink-jet type printing unit 24 by the N-valued data generating unit 20.

Figures 16A, 16B:
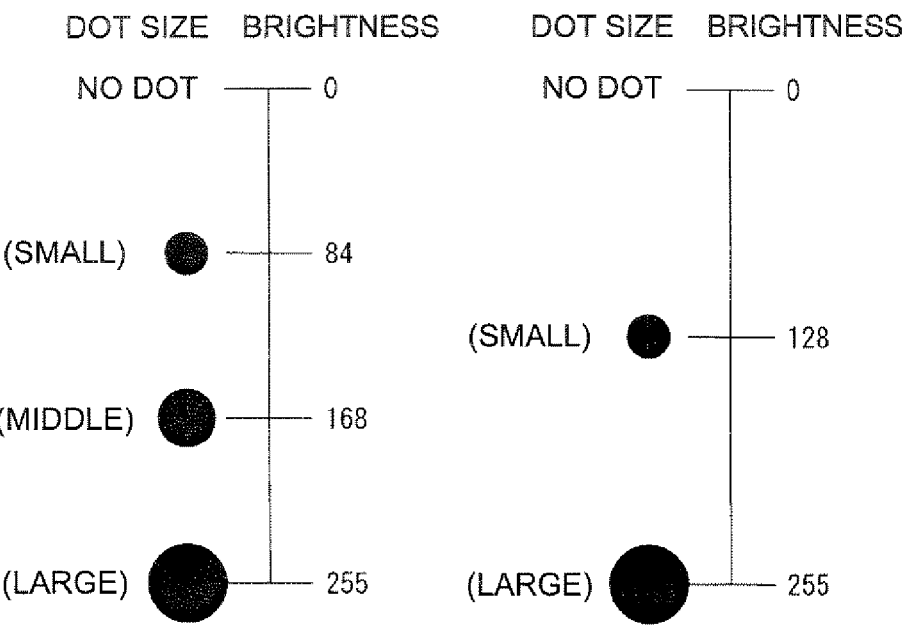
FIGS. 16A and 16B are views showing an example of the relationship between dot size and density.
Figures 17A, 17B:
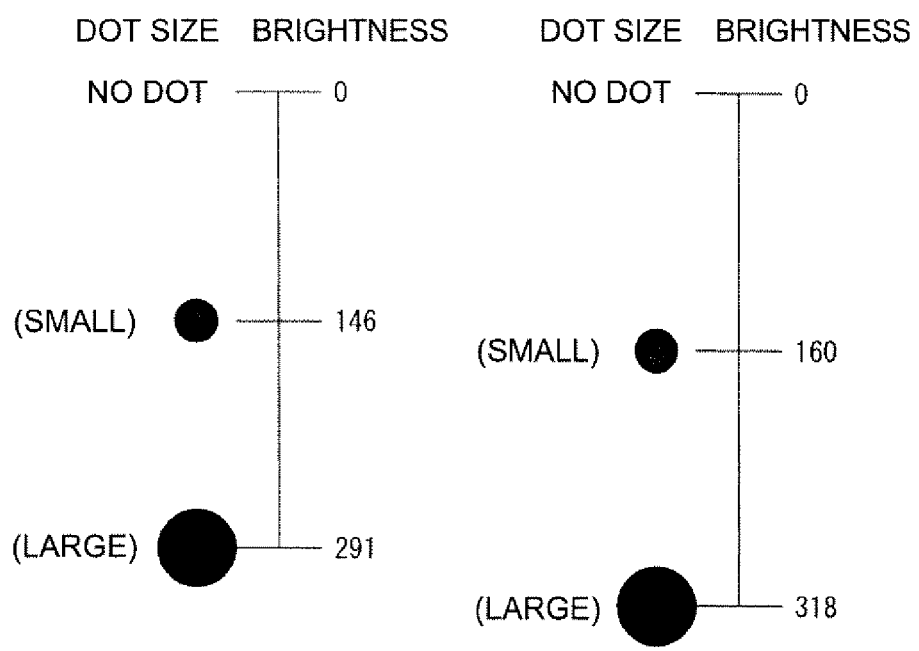
FIGS. 17A and 17B are views showing another example of the relationship between dot size and density.

FIGS. 16A and 16B show an example of the density value and the dot size.

For example, referring FIG. 16A, the average densities "84", "168", and "255" can be expressed by allocating a "small dot," a "middle dot," and a "large dot" to pixels, respectively, and referring to FIG. 16B, the average densities "128" and "255" can be expressed by a "small dot" and a "large dot" to pixels, respectively. In addition, in the following embodiment, as shown in FIG. 16B, an example using two kinds of dots, such as a "small dot" and a "large dot, " in order to make the explanation easy to understand will be described.

Further, the technique itself which prints separate sizes of dots in any direction in one printed material as described above is a conventionally known technique, and a technique which has conventionally been frequently used under the name called MSDT (Multi Size Dot Technology) particularly when a printed material which realizes printing speed and printed image quality with high balance.

That is, making the dot size small ensures high image quality, whereas making the dot size small requires advanced performance of machine accuracy, and forming a Beta image with small dots needs a lot of dots to be printed. A high-definition image portion is obtained by making the dot size small, and a Beta image portion is obtained by realizing printing speed and image quality with high balance by using the technique of printing separate sizes of dots, including making the dot size large.

In addition, as the technical method of realizing printing of separate sizes of dots as such, for example, in the case of the method in which a piezoelectric element (piezo actuator) is used in the print head 200 as described above, it is possible to easily realize the separate sizes of dots by changing the voltage to be applied to the piezoelectric element to control the discharge amount of ink.

Next, the printing unit 24 is an ink-jet type printer which is adapted to inject ink in the form of dots from the nozzle modules 50, 52, 54, and 56 formed in the print head 200 while one or both of the printing medium (sheet) S and the print head 200 moves so that a predetermined image composed of a large number of dots may be formed on the printing medium S. This printing unit is composed of known components, such as a print head feeding mechanism (not shown) which reciprocates the print head 200 above the printing medium S in the width direction thereof (in the case of a multipass type printer), a sheet feeding mechanism (not shown) which moves the printing medium S, and a print controller mechanism (not shown) which controls the discharge of ink of the print head 200 based on the data for printing, in addition to the above-mentioned print head 200.

Figure 2:
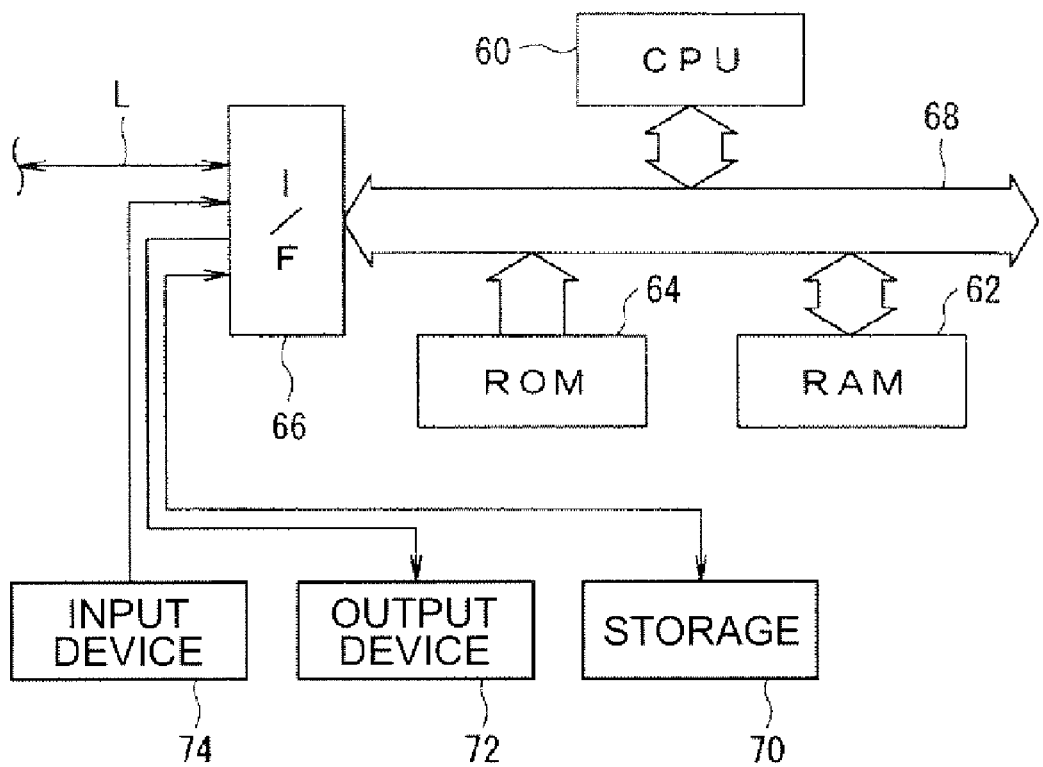
FIG. 2 is a block diagram showing the hardware configuration of a computer system which realizes the printing apparatus according to the invention.

Here, the printing apparatus 100 includes a computer system for realizing on software various kinds of controls for printing, and the image data acquiring unit 10, the density unevenness information acquiring unit 12, the density unevenness correcting unit 14, the dot ratio information storing unit 16, the dot ratio information selecting unit 18, the N-valued data generating unit 20, the print data generating unit 22, the printing unit 24, etc. The hardware configuration of the printing apparatus, as shown in FIG. 2, is obtained by connecting a CPU (Central Processing Unit) 60 that is a central processing unit which is responsible for various kinds of control and arithmetic processing, a RAM (Random Access Memory) 62 which constitutes a main storage, a ROM (Read-Only Memory) 64 that is a read-only storage, by various internal and external buses 68 including a PCI (Peripheral Component Interconnect) bus, an ISA (Industrial Standard Architecture) bus, etc., and by connecting the network L for communicating with an external storage (Secondary Storage) 70, such as an HDD (Hard Disk Drive), a printing unit 24, an output device 72, such a CRT or an LCD monitor, input devices 74, such as a console panel, a mouse, a keyboard, and a scanner, a printing instruction unit (not shown), etc. to the buses 68 via an input/output interface (I/F) 66.

When power is supplied, a system program, such as BIOS, which is stored in the ROM 64, loads to the RAM 62 various kinds of exclusive computer programs stored in advance in the ROM 64 or various kinds of exclusive computer programs installed in the storage 70 via storage media, such as CD-ROM, DVD-ROM, and a flexible disk (FD), or via the communication network L, such as the Internet, and the CPU 60 performs predetermined control and arithmetic processing by using various resources according to the commands described in the programs loaded to the RAM 62 so that each function of each unit as described above can be realized on software.

Figure 18:
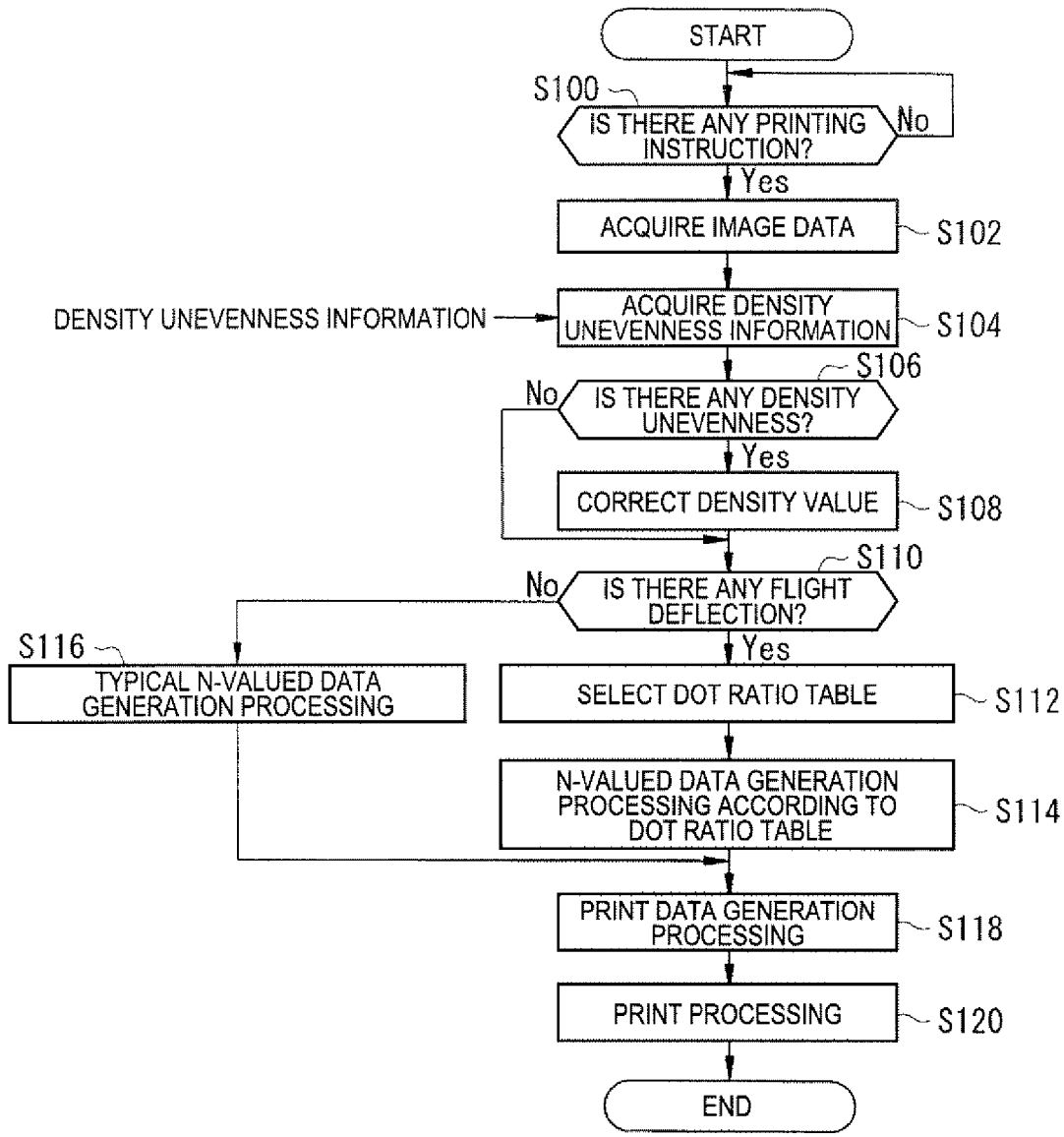
FIG. 18 is a flowchart showing an example of the flow of the entire printing processing of the invention.

Next, an example of print processing using the printing apparatus 100 will be described mainly referring to the flowchart of FIG. 18.

In addition, although the print head 200 for printing dots as described above can generally print dots of a plurality of colors, such as four colors and six colors, at about the same time, a case in which any dot is printed by the print head 200 for any one color (monochrome or monochrome image) will be described in the following examples in order to make the explanation easy to understand.

First, if the printing apparatus 100 has completed a predetermined initial operation for print processing after supply of power thereto and is connected with a printing instruction terminal (not shown), such as a personal computer, the image data acquiring unit 10 monitors whether there is any explicit printing instruction from the printing instruction terminal in the first step S100, and, if it is determined that this printing instruction and the multi-valued image data to be processed have been sent, the image data acquiring unit acquires the image data in the next step S102.

In addition, when the image data acquired by the image data acquiring unit 10 at this time is multi-valued RGB data, as described above, this data is converted into multi-valued CMYK data corresponding to used ink, etc. based on a predetermined conversion algorithm, and thereafter the multi-valued CMYK data will be treated as the image data to be processed.

Next, if the image data to be processed is acquired in this way, the process proceeds to the next step S104 where the density unevenness information on the print head 200 which is stored in the information storage section 12a of the density unevenness information acquiring unit 12, etc., is acquired. Thereafter, the process proceeds to the next determination step S106 where it is determined whether or not any nozzle which causes the "density unevenness" due to poor ink discharge amount exists in the print head 200.

The process jump to Step S110 when it is determined that the "density unevenness" does not exists (density unevenness is not caused) (No). However, when it is determined that any nozzle which causes the "density unevenness" exists (Yes), the process proceeds directly to the next step S108 where the density value of a pixel (row) corresponding to the nozzle which causes the "density unevenness" is corrected. Specifically, for example, as described above, in a case in which the printing density of a nozzle which causes the "density unevenness" is smaller than a specified value (in a case in which the ink discharge amount becomes less than a prescribed amount, and consequently the size of a dot to be printed becomes small), correction is caused to the density value of a pixel (row) corresponding to the nozzle may be increased so that the printing density of the nozzle may become a specified value. This can effectively eliminate the banding phenomenon resulting from "density unevenness" or can make the phenomenon nearly inconspicuous.

Next, if the correction processing of a density value is completed in this way, the process proceeds to the determination step S110 where it is determined whether or not there exist any nozzle which causes the phenomenon of a predetermined amount or more of flight deflection which may cause a banding phenomenon among the nozzles of the print head 200 based on the density unevenness information acquired in the step S104.

When it is determined that there exists no nozzle which causes the flight deflection phenomenon (No), the process proceeds to the step S116 where typical N-valued-data generation processing is performed for every predetermined region to be processed by the dither method as described above. In contrast, if it is determined that there exists any nozzle which causes the flight deflection phenomenon (Yes), the process proceeds to the next step S112 where a dot ratio table 300 according to the flight deflection amount is selected.

Figures 19, 20:
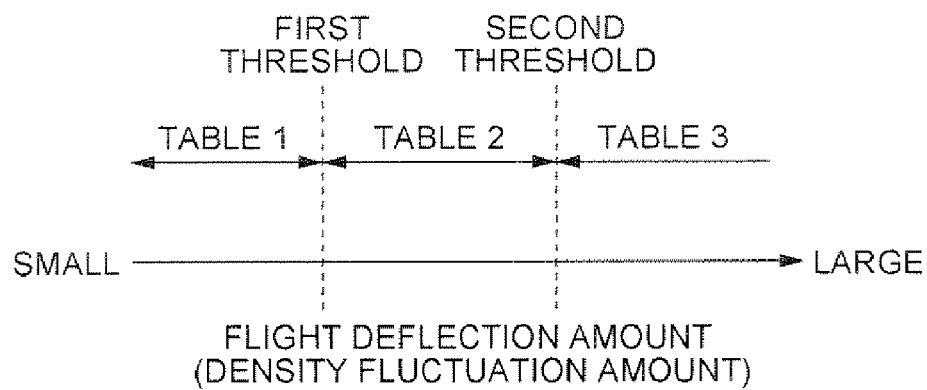
FIG. 19 is a view showing an example of a combination of dot ratio tables.
FIG. 20 is a view showing another example of the combination of dot ratio tables.

FIGS. 19 and 20 show an example of a selection criterion and a selecting method of the dot ratio tables 300 in the step S112.

The selection criterion of the dot ratio tables 300 of FIG. 19 is selected by combining three kinds of dot ratio tables 300 (specifically, FIG. 12A to FIG. 12C are referred to as Table 1, Table 2, and Table 3, respectively) according to the flight deflection amount (corresponding to the density fluctuation amount which shows the size of density unevenness). Specifically, "Table 1" is selected when the flight deflection amount is smaller than a first threshold, "Table 3" is selected when the flight deflection amount is greater than a second threshold, and "Table 2" is selected when the flight deflection amount is located between the first threshold and the second threshold.

Meanwhile, the dot ratio table selecting method of FIG. 20 specifies that the dot ratio tables 300 selected as the flight deflection amount for every nozzle is selected.

If a predetermined dot ratio table 300 is selected in this way, the process proceeds to the next step S114 where N-valued processing is performed for every predetermined region of the image data so that it may become a dot ratio specified in the dot ratio table 300. Thereafter, the process proceeds to the next step S118 where the print data that a dot corresponding to the N-valued processing is allocated to every predetermined region is generated. Then, in the final step S120, printing is performed based on the print data by using the print head 200, and the processing is ended.

Figure 21:
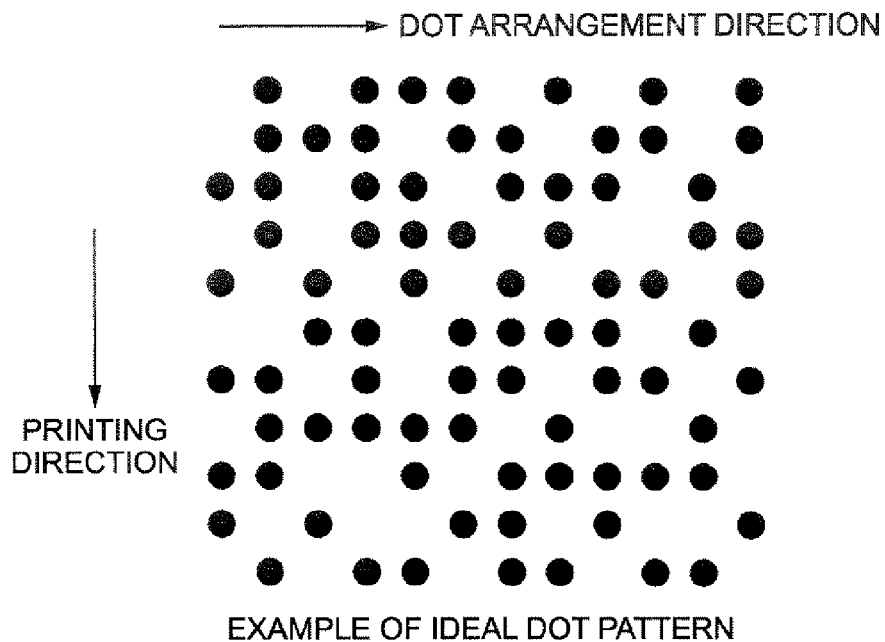
FIG. 21 is a conceptual diagram showing an example of an ideal dot pattern constituting a region to be processed, in which the flight deflection phenomenon is not caused.
Figure 22:
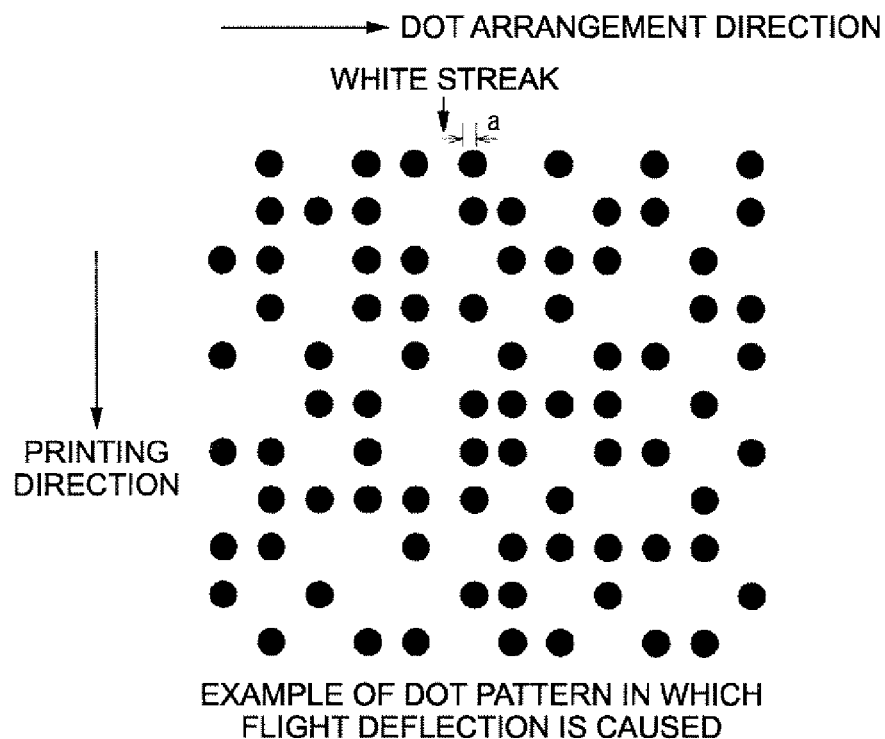
FIG. 22 is a conceptual diagram showing an example of a dot pattern constituting a region to be processed, in which the flight deflection phenomenon is caused.

FIG. 21 shows an example of an ideal dot pattern in which neither the "density unevenness" nor the "flight deflection" are caused, in each processing object region of a printed material to which the printing processing has been performed in this way, and FIG. 22 shows an example of a dot pattern in which the "flight deflection" is caused in some nozzles and consequently the dots to be printed by the nozzles are printed in a state where they deviate by a distance "a" from their regular position in the same printed material.

Figure 23:
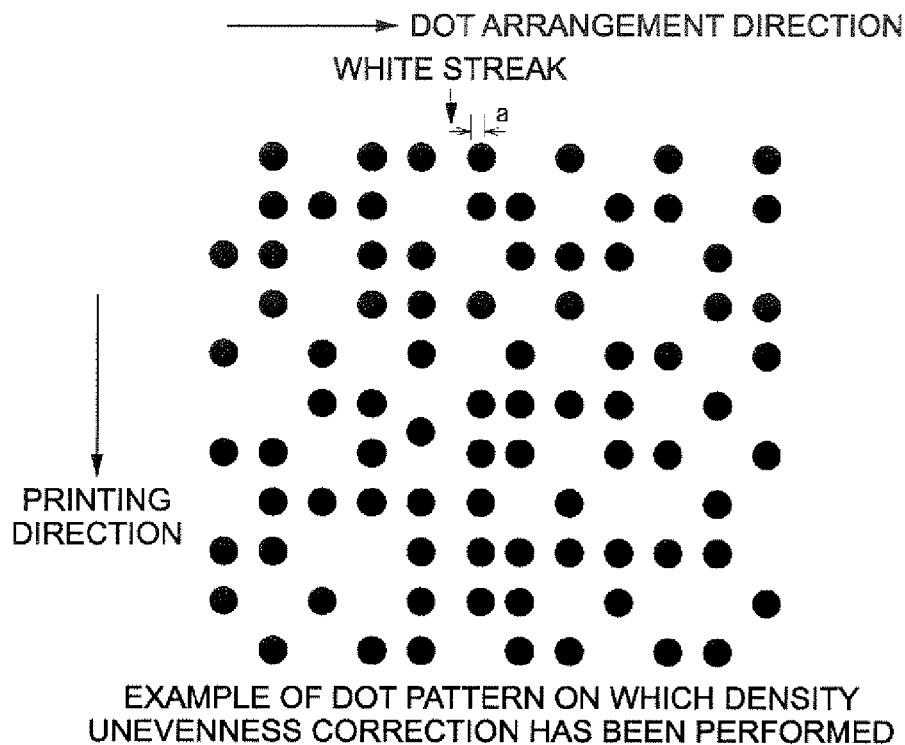
FIG. 23 is a conceptual diagram showing an example in which the density unevenness correction processing has been performed to the dot pattern of FIG. 22.

Also, FIG. 23 shows that the density unevenness correction processing has been performed to a pixel row corresponding to a nozzle which causes printing deviation in a case in which the "flight deflection" as shown in FIG. 22 is caused. Simply performing the density unevenness correction processing to the pixel row in which a white streak is generated as such makes the dot density high and makes the white streak still remain in that part. As a result, not only the banding resulting from the flight deflection cannot be eliminated, but also the density of the pixel row becomes rather high, and consequently a dark streak in the vicinity of the white streak will be more conspicuous.

Figure 24:
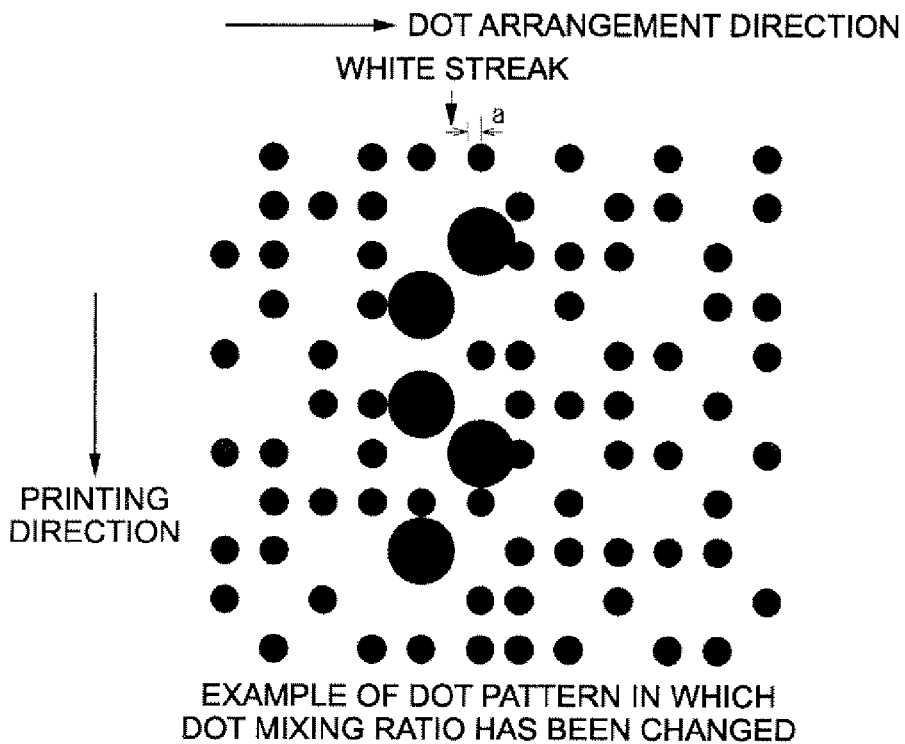
FIG. 24 is a conceptual diagram showing an example in which the dot mixing ratio has been changed along with the density unevenness correction processing to the dot pattern of FIG. 22.

In contrast, FIG. 24 shows that the dot mixing ratio of the processing region is changed according to the dot ratio tables 300 in a case in which the flight deflection is caused as described above. Although this deteriorates the granularity of that part slightly, a white streak resulting from the banding can be effectively eliminated or made nearly inconspicuous.

Further, since the dot mixing ratio is changed based on the average density value of the processing region, the area gray-scale inherent in the processing region is similarly not spoiled.

In this way, according to the invention, different sizes of dots can be made appropriately mixed in a printed image composed of a plurality of dots based on the dot ratio tables 300. Therefore, it is possible to effectively eliminate the banding phenomenon, such as a white streak or a dark streak, which is generated by the so-called flight deflection or density unevenness, or make the banding phenomenon nearly inconspicuous. As a result, a high-quality printed material can be obtained easily.

Figure 13A:
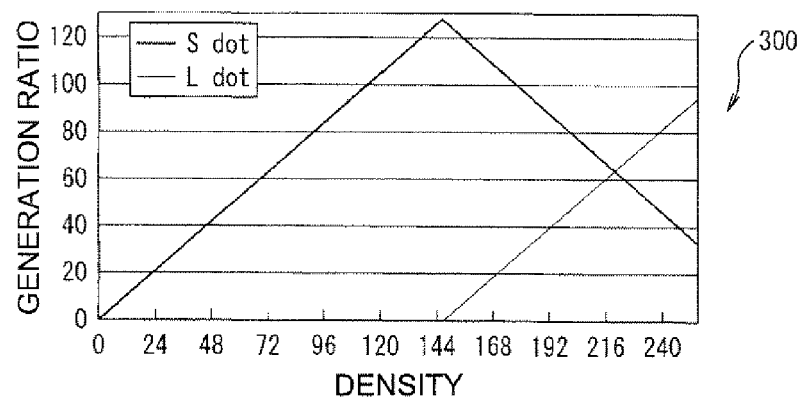
FIGS. 13A to 13C are views showing another example of a dot conversion table.
Figure 13B:
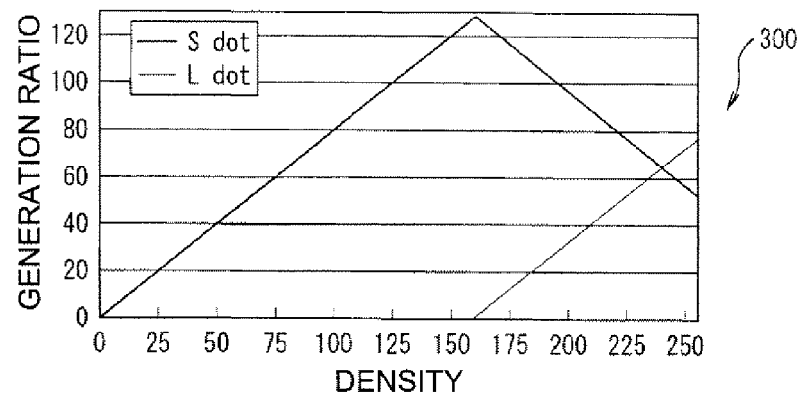
Figure 13C:
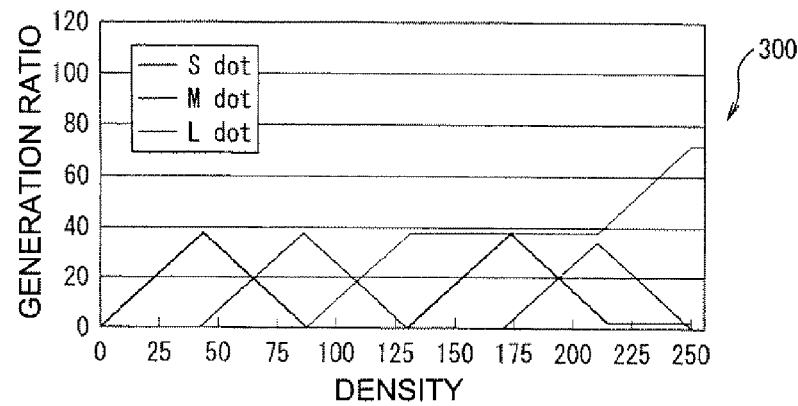

In addition, although the dot pattern shown in FIG. 24 in which the dot mixing ratio has been changed is obtained by changing the dot mixing ratio according to the dot ratio tables 300 which specify the mixing ratio of dots having two kinds of different sizes as shown in FIGS. 12A to 12C, etc., the dot ratio tables 300 which specify the mixing ratio of dots having three kinds of different sizes as shown in the dot ratio tables 300 of FIG. 13C, etc. may be used. In this case, the density of the processing region will be expressed by the combination of the dots having three kinds of different sizes.

Further, although the present embodiment describes that the existence/nonexistence (Step S110) of the flight deflection phenomenon and the existence/nonexistence determination (Step S106) of the density unevenness are determined separately, it is also possible to consider that the occurrence of the density unevenness phenomenon itself is caused by the flight deflection phenomenon, and vice versa.

Accordingly, the selection processing, etc. of the dot ratio tables 300 as shown in Step S112, etc. may be performed based on either the density unevenness or the flight deflection phenomenon.

Figure 25:
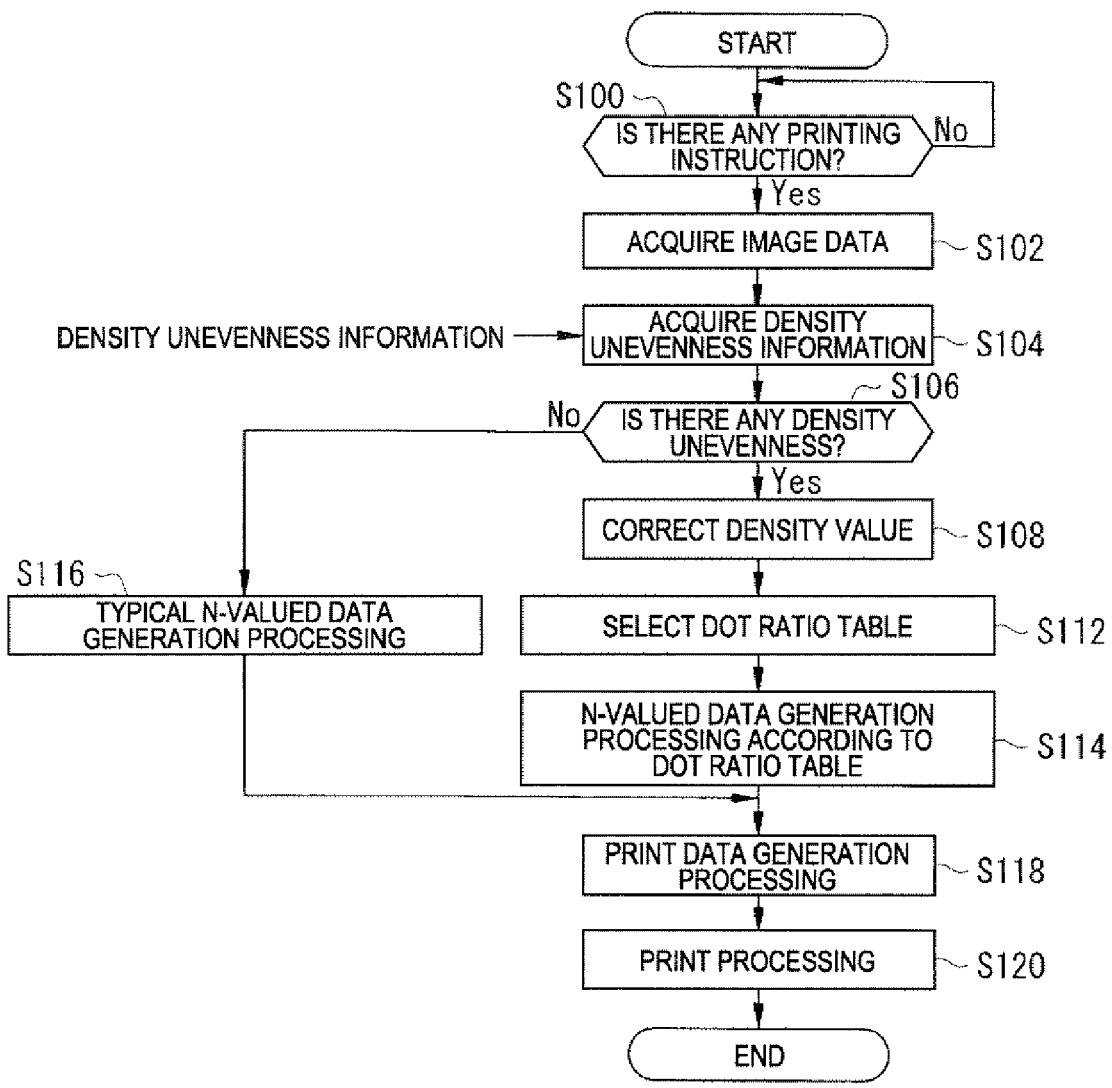
FIG. 25 is a flowchart showing another example of the flow of the entire printing processing of the invention.

Specifically, for example, as shown in the flow chart of FIG. 25, when it is determined that there is no density unevenness in the determination processing about the existence/nonexistence of the density unevenness in the fourth step S106 (No), the process proceeds straight to Step S116 where the typical N-valued data generation processing is performed. In contrast, when it is determined that there is any density unevenness in the determination processing about the existence/nonexistence of the density unevenness in this step S106 (Yes), the same density value correction processing as the above is performed in the next step S108, and thereafter the process proceeds straight to the next step S112 where a dot ratio table 300 is selected according to the density value correction amount, skipping the determination step S110 about the existence/nonexistence of the flight deflection phenomenon as shown in Step S110 of the flow chart of FIG. 18.

An aspect which does not use the information on the above-mentioned flight deflection phenomenon for the trigger which performs the selection processing of the dot ratio tables 300 in this way may be used. In addition, in a case in which only the density unevenness information is used and the information on the flight deflection phenomenon is not used in the selection processing of the dot ratio tables 300 like this, as shown in FIG. 1, the information acquired from the density unevenness information acquiring unit 12 by the dot ratio information selecting unit 18 is only the information on the density unevenness. Therefore, it is possible to significantly reduce the amount of information. Accordingly, it is possible to obtain the effect that the time taken to acquire the information or the time taken to process the information cam be significantly reduced.

Further, the print head 200 in the present embodiment corresponds to the print head in the printing apparatus of Aspect 1. Similarly, the image data acquiring unit 10, the density unevenness information acquiring unit 12, the density unevenness correcting unit 14, the dot ratio information storing unit 16, the dot ratio tables, the dot ratio information selecting unit 18, N-valued data generating unit 20, the print data generating unit 22, the printing unit 24, etc., correspond to the image data acquiring unit the density unevenness information acquiring unit, the density unevenness correcting unit, the dot ratio information storing unit, the dot ratio information, the dot ratio information selecting unit, the N-valued data generating unit, the print data generating unit, the printing unit, etc., respectively, in the printing apparatus of Aspect 6, etc.

Further, since the printing apparatus 100, etc. of the invention which is realized in the above embodiment, is adapted such that the dot mixing ratio is changed according to the density unevenness information of the print head, without making substantial alterations to the existing print head 200 and existing printing unit 24 themselves, it is not necessary to particularly prepare exclusive ones as the print head 200 or the printing unit 24 and it is possible to utilize a conventional existing ink-jet type print head 200 and existing ink-jet type printing unit 24 (printer).

Accordingly, if the print head 200 and the printing unit 24 are separated from the printing apparatus 100 of the invention, their functions can be realized only with a general-purpose information processor (image processing apparatus), such as a personal computer.

Further, not to mention that the printing apparatus 100 of the invention is not limited to the aspect in which all the functions are accommodated into the housing as one, for example, some of the functions may be partitioned so that the functions from the image data acquiring unit 10 to the N-valued data generating unit 20 may be realized on the side of a personal computer, and the functions of the print data generating unit 22 and the printing unit 24 may be realized on the side of a printer.

Further, the invention can be similarly applied to a case where the discharge direction of ink is perpendicular (normal) but the position where a nozzle is formed deviates from a regular position, and consequently a dot to be formed experiences the same results as the flight deflection phenomenon, as well as the density unevenness and the flight deflection phenomenon.

Furthermore, the invention can also be similarly applied to a case in which ink is not discharged from a specific nozzle due to ink clogging, etc.

Further, the printing apparatus 100 of the invention can be applied not only to a line-head type ink jet printer but also to a multipass type ink jet printer (serial printer). If the printing apparatus is a line-head type ink jet printer, it is possible to obtain at one pass a high-quality printed material in which a white streak and a dark streak are hardly conspicuous, and if the printing apparatus is a multipass type ink jet printer, it is possible to realize printing at a higher speed than before because the number reciprocations can be reduced. For example, in a case in which desired image quality can be realized by one printing, as compared with a case where printing is performed by reciprocal printing of K times, printing time can be shortened to 1/K.

Figure 26A:
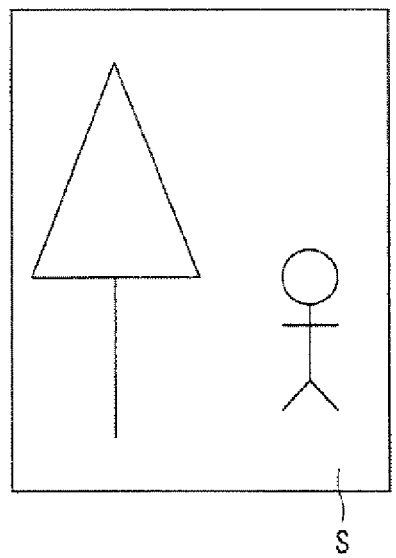
FIGS. 26A to 26C are explanatory views showing differences in the printing methods by the multipass type ink jet printer and the line-head type ink jet printer.
Figure 26B:
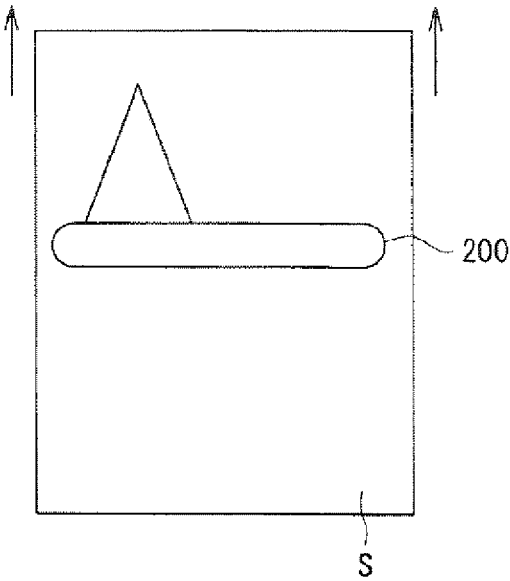
Figure 26C:
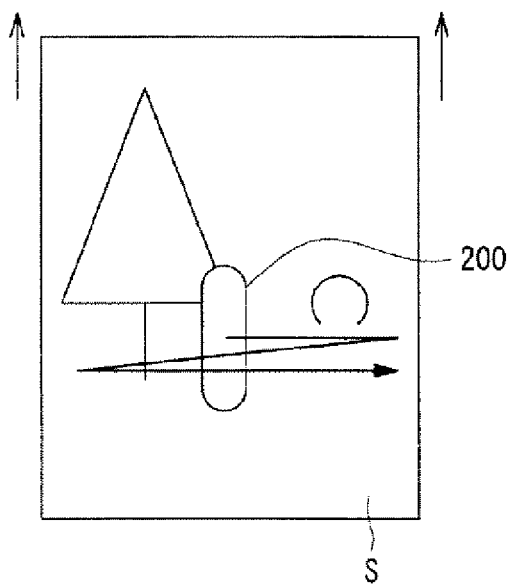

FIGS. 26A to 26C respectively show the printing methods by the multipass type ink jet printer and the line head type ink jet printer.

As shown in FIG. 26A, in a case in which the image data to be printed on a rectangular print sheet S is targeted, the print head 200 in the line-head type ink jet printer, as shown in FIG. 26B, has a length equivalent to the width of the print sheet S, and this print head 200 is fixed and the print sheet S is caused to move in a direction perpendicular to the nozzle arrangement direction with respect to this print head 200, thereby completing so-called one scanning (one pass). In addition, it is also possible to perform printing while the print sheet S is fixed and the print head 200 is caused to move in a direction perpendicular to the nozzle arrangement direction or both the print sheet and the print head are caused to move in opposite directions, like a so-called flat-bed type printer. In contrast, the multipass type ink jet printer, as shown in FIG. 26C, is adapted to perform printing by locating a print head 200 which is far shorter than the sheet width in a direction perpendicular to the nozzle arrangement direction, and moving the printing sheet S by a predetermined pitch in a direction perpendicular to the nozzle arrangement direction while the print head is caused to reciprocate several times in the nozzle arrangement direction. Accordingly, the latter multipass type ink jet printer (serial printer) has a drawback that printing time is longer as compared with the former line-head type ink jet printer, while it has an advantage that, since the print head 200 can be repeatedly located in an arbitrary spot, it is possible to reduce the above-mentioned white streak phenomenon to some degree, among the banding phenomena as mentioned above.

Further, although the ink jet printer which discharges in the form of dots to perform printing has been described as an example in the present embodiment, the invention can also be applied to other printing apparatuses using a print head of the type in which a printing mechanism is arranged in a line, for example, a thermal head printer also called a thermal transfer printer, a thermosensitive printer, and the like.

Figure 27:
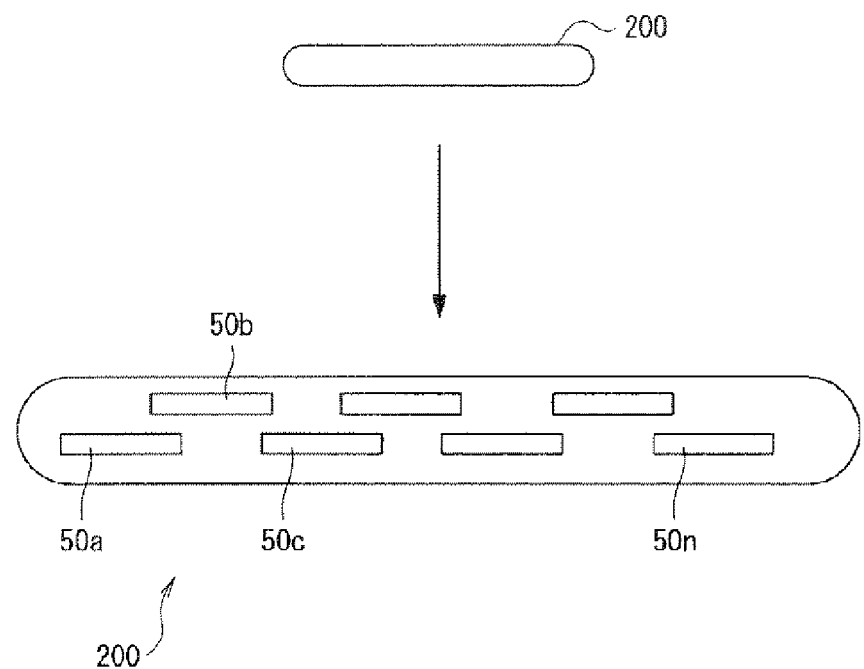
FIG. 27 is a conceptual diagram showing another example of the structure of the print head.

Further, FIG. 3 shows that each of the nozzle modules 50, 52, 54, and 56 provided for each color of the print head 200 is configured such that the nozzles N are arranged continuously in the longitudinal direction of the print head 200. However, as shown in FIG. 27, each of the nozzle modules 50, 52, 54, and 56 may be composed of a plurality of short nozzle units 50a, 50b, . . . , and 50n, and these nozzle units may be arranged backward and forward in the direction of movement of the print head 200. Particularly if each of the nozzle modules 50, 52, 54, and 56 is composed of the plurality of short nozzle units 50a, 50b, . . . , and 50n like this, the yield rate improves significantly compared with the case where each nozzle module is composed of a long nozzle unit.

Figure 28:
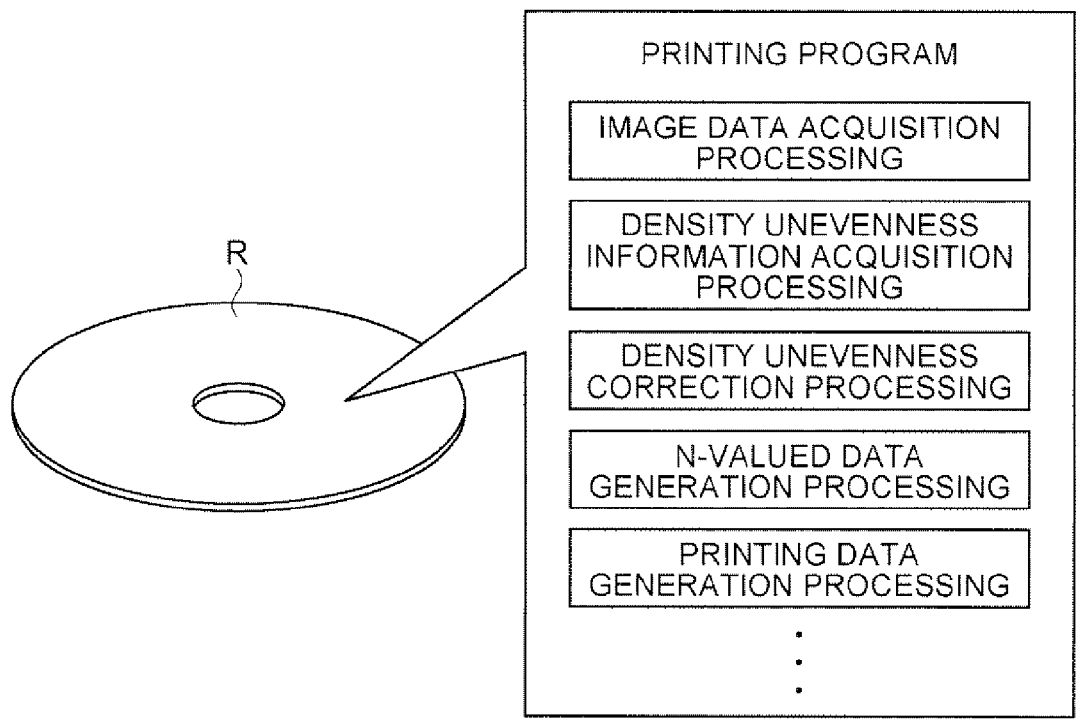
FIG. 28 is a conceptual diagram showing an example of a computer-readable recording medium on which a program according to the invention is recorded.

Further, each mechanism for realizing the printing apparatus 100 of the above-mentioned present embodiment can be realized in software using a computer system incorporated into most existing printing apparatuses. A computer program is incorporated into a product in the state of being stored in a semiconductor ROM in advance, or is distributed via networks, such as the Internet. Otherwise, as shown in FIG. 28, the computer program can be easily provided to a desired user via a computer-readable recording media R, such as CD-ROMs, DVD-ROMs, and FDs.

Figure 29:
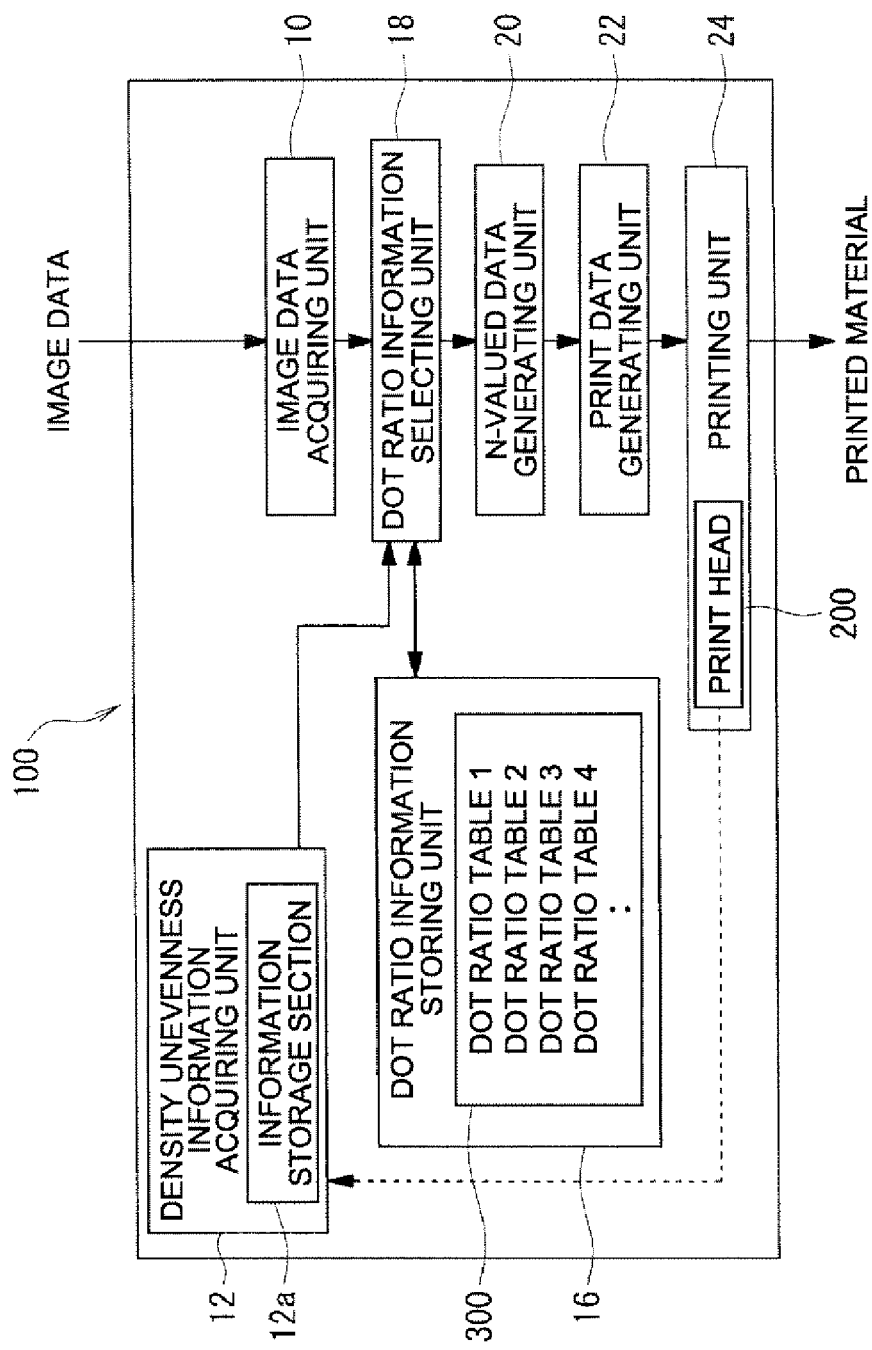
FIG. 29 is a functional block diagram showing a second embodiment of the printing apparatus according to the invention.
Figure 30:
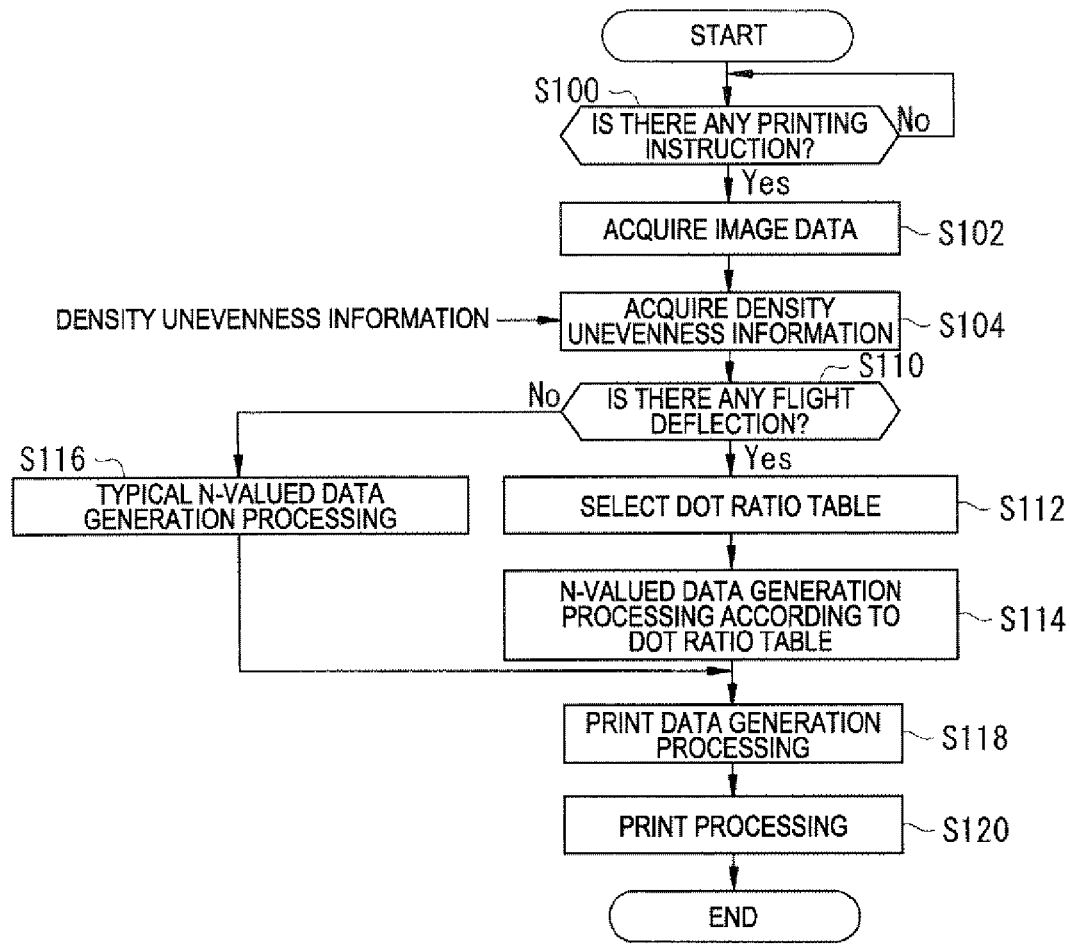
FIG. 30 is a flowchart showing an example of the flow of the processing related to a second embodiment.

Next, FIGS. 29 and 30 show a printing apparatus 100, a printing program, a printing method, an image processing apparatus, an image processing program, an image processing method, and a computer-readable recording medium according to a second embodiment of the invention.

First, FIG. 29 is a functional block diagram showing a printing apparatus 100 according to the second embodiment of the invention.

As shown in FIG. 29, the printing apparatus 100 mainly includes a print head 200 in which a plurality of nozzles which can print different sizes of dots are arranged, an image data acquiring unit 10 which acquires image data having M-value density information (M≧3) for every pixel, a density unevenness information acquiring unit 12 which acquires information on the density unevenness of the nozzles of the print head 200, a dot ratio information storing unit 16 which stores a plurality of dot ratio tables 300 which specifies the mixing ratio (dot generation ratio of each size) of each of the different sizes of dots, a dot ratio information selecting unit 18 which selects a predetermined dot ratio table 300 among the dot ratio tables 300 stored in the dot ratio information storing unit 16, an N-valued data generating unit 20 which performs N-valued processing (M>N≧2) on the image data to generates N-valued data, a print data generating unit 22 which generates print data from the N-valued data generated by the N-valued data generating unit 20, and an ink-jet type printing unit 24 which performs printing using the print head 200 based on the print data generated by the print data generating unit 22.

That is, the present embodiment has a configuration from which the density unevenness correcting unit 14 in the above first embodiment is omitted, and shows an example of printing processing which is particularly effective for the printing apparatus 100 including a print head 200 which hardly causes density unevenness phenomenon, but causes the flight deflection phenomenon.

Accordingly, although the printing processing related to the present embodiment is the same as that of the above first embodiment from the first step S100 to the third step S104 as shown in FIG. 30, the determination processing on whether or not any flight deflection exists is performed in the next step S110, and the same processing as that of the above first embodiment is then performed according to the determination result.

Since this makes it unnecessary to perform the correction processing, etc. to the density unevenness, the banding elimination processing can be realized more efficiently.

Further, the print head 200 in the present embodiment corresponds to the print head in the printing apparatus of Aspect 1. Similarly, the image data acquiring unit 10, the density unevenness information acquiring unit 12, the dot ratio information storing unit 16, the dot ratio tables, the dot ratio information selecting unit 18, N-valued data generating unit 20, the print data generating unit 22, the printing unit 24, etc., correspond to the image data acquiring unit the density unevenness information acquiring unit, the density unevenness correcting unit, the dot ratio information storing unit, the dot ratio tables, the dot ratio information selecting unit, the N-valued data generating unit, the print data generating unit, the printing unit, etc., respectively, in the printing apparatus of Aspect 4, etc.

In addition, although the first and second embodiments have only been described in conjunction with the case in which the same kind of dot ratio fluctuates in density, it is possible to set the dot ratio so that a special size of dots may be generated only under specific conditions. This is because generation of a white streak cannot be avoided particularly in a dot size which is generally designed in nozzles having a large amount of flight deflection.

Figure 31:
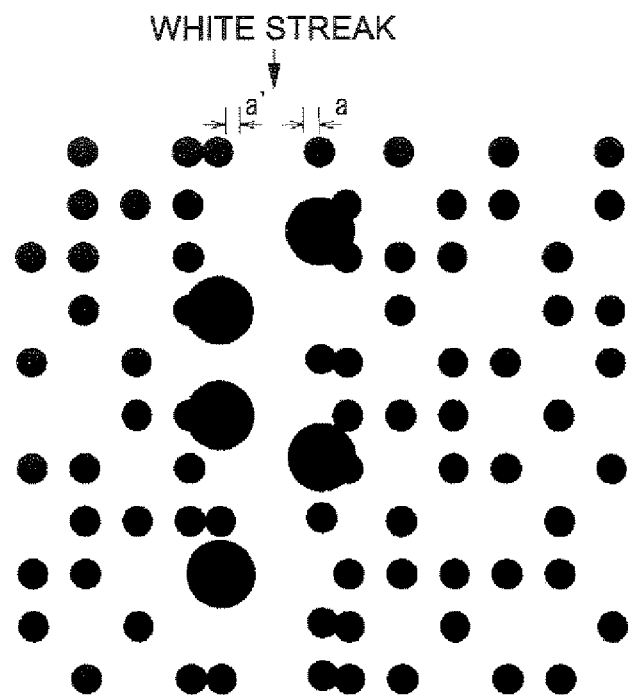
FIG. 31 is a view showing an example of a dot pattern in which the flight deflection amount is great significantly, and generation of a white streak cannot be avoided only by changing dot size.

FIG. 31 is a view showing an example of a dot pattern in which the flight deflection amount is significantly great, and generation of a white streak cannot be avoided only by changing dot size.

Figure 32:
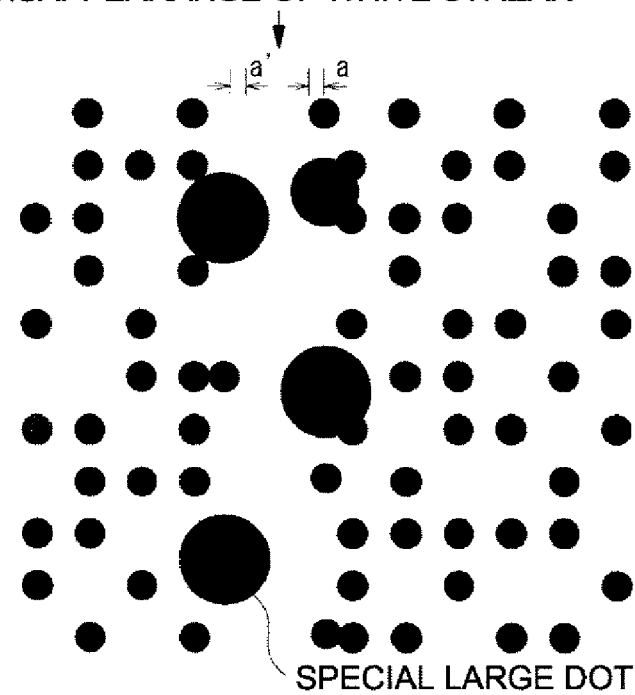
FIG. 32 is a view showing an example of a dot pattern in which a special large dot which is still larger than a typical large dot is printed.

In contrast, FIG. 32 shows that a special large dot which is still larger than a typical large dot is printed. It can be understood from this figure that it is possible to make a white streak inconspicuous by printing such a special large dot. Further, in a case of a Beta image whose entire surface is coated with ink, when attention is paid to a nozzle location where the flight deflection amount is great, it is possible to address such a problem by using such a large dot, though the image cannot be coated with typical dots.

Figure 33:
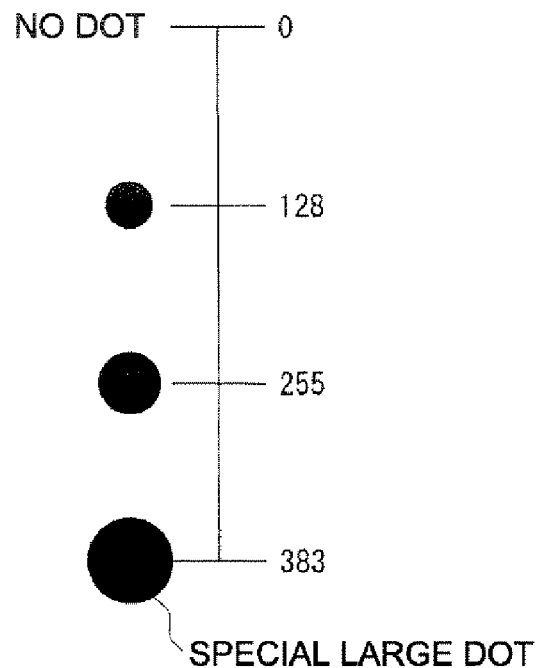
FIG. 33 is a view showing an example of the density value of the special large dot.
Figure 34:
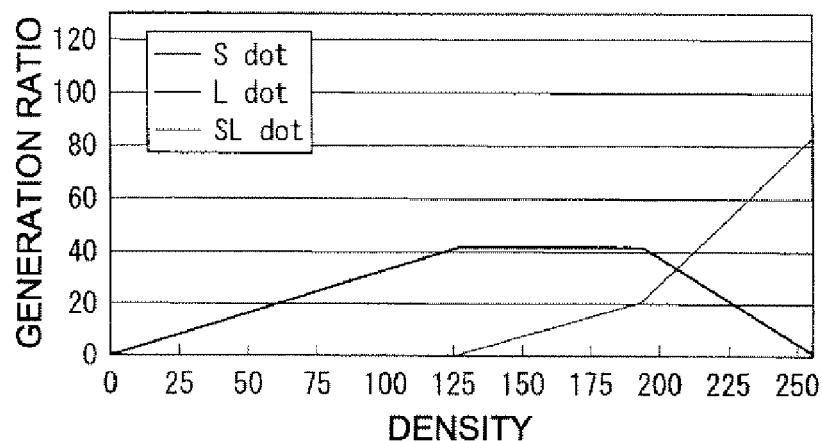
FIG. 34 is a view showing an example of dot ratio tables when the special large dot is used.

FIG. 33 is an example showing the density value of such a special large dot. The dot which realizes density which is not usually needed is given like this. Further, FIG. 34 is a view showing an example of dot ratio tables 300 when such a special large dot is used. It can be understood from this figure that, even if very great banding is caused by applying such a significantly large dot, visual banding can be effectively eliminated. In addition, although the dot ratio table shown in FIG. 34 is seen as if being composed of two graphs because both the generation ratio of S dot and the generation ratio of L dot are set to the same ratio and thus both graphs overlap each other completely, it is practically composed of three graphs corresponding to S dot, L dot, and SL dot, respectively.

Further, although it is assumed in each of the above-mentioned embodiments that the density to be output is set to be always the same even if the mixing ratio of dots is changed with respect to the density indicated by N-valued processing, and the module which corrects the density unevenness is separately prepared and processed in a case in which density fluctuation is required due to a difference between dot sizes like the above embodiments, the density unevenness can be caused to be mixed in advance in the dot ratio tables 300 as another embodiment.

That is, if the dot ratio tables 300 in which the dot size is taken into consideration with respect to the nozzles which tends to increase in dot size as a whole is set and processed, it is possible to absorb all the variations of the nozzles by selecting only the dot ratio tables 300.

For example, as shown in FIG. 20, a dot ratio table 300 to be used for every nozzle is set in advance, and processing is performed while the dot ratio table 300 set for every nozzle is selected during printing.

Figure 35A:
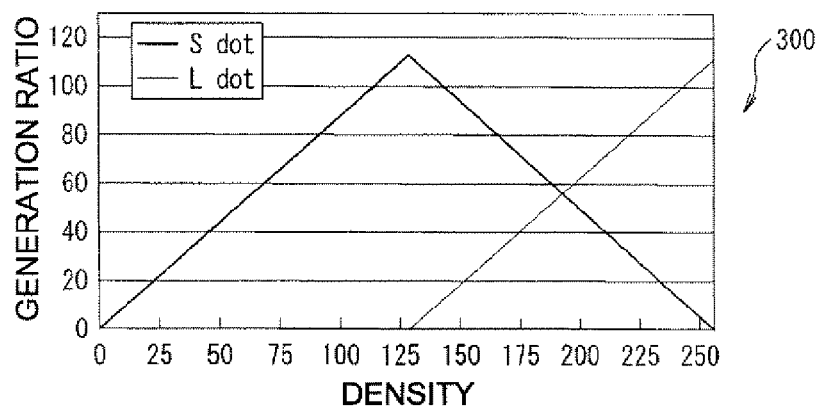
FIGS. 35A and 35B are views showing another example of a dot ratio table in which dots are set with respect to the dot to be discharged greatly.
Figure 35B:
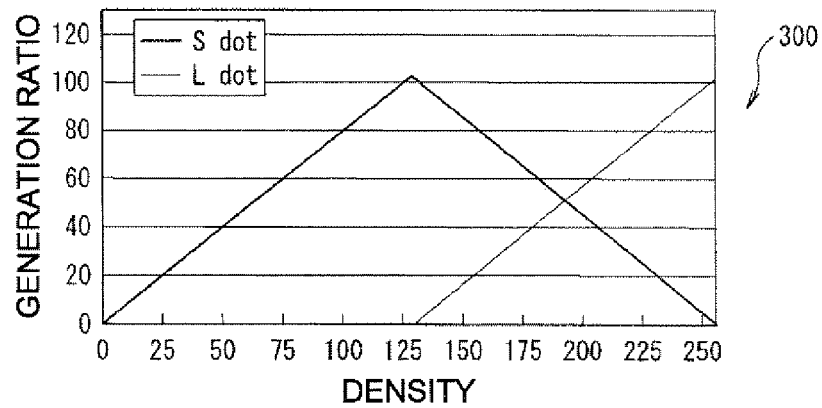

As shown in FIGS. 17A and 17B, FIGS. 35A and 35B show examples of the dot ratio tables 300 to be set for the dot greatly discharged, and correspond to the dot ratio tables 300 of FIGS. 12A to 12C of FIG. 16B mentioned above, respectively. In FIGS. 35A and 35B, the dot printing amount in each density is reduced as much as an increase in dot size without changing the range to be covered by a dot of each size.

Further, in a case in which changing a density axis also taken into consideration and processing is performed by this method, the result becomes the same as the case where the density change and the dot ratio tables 300 are unified together, and the dot ratio tables in this case are as shown in FIGS. 13A and 13B.

In addition, similarly to FIGS. 12A and 12B, the dot ratio table 300 of FIG. 13A specifies that only "small dots" are generated when the average density of a region to be processed is low, and "large dots" are generated instead of the "small dots" when the average density of the region is high so as to express the density of the region, but the generation ratio of the "large dots" is greater than that of FIGS. 12A and 12B. Further, the dot ratio table 300 of FIG. 13C specifies that dots having three kinds of sizes including "middle dots (Mdot)" having a middle size in addition to "small dots" and "large dots," are combined so as to express the density of the region.

However, since using the dot ratio tables 300 of FIGS. 35A and 35B can use each dot size effectively like other regions as criteria, a sudden image quality change is not caused, but a natural image is obtained.

Incidentally, FIG. 13C shows an example of the dot ratio tables 300 for the nozzles which cause flight deflection and tend to increase in dot size, similarly to FIGS. 35A and 35B, and is designed with the idea that the shape of the dot ratio tables 300 does not change (although each dot size is generated, the generation frequency becomes less in each density).

Design can be controlled so that these dot ratio tables 300 may be set according to the density (ink discharge amount) and the flight deflection amount of nozzles, and banding avoiding may be realized only by selection of a dot ratio table 300.

Further, in above first and second embodiments, the selection of a dot ratio table is made from the three kinds of dot ratio tables 300 according to the flight deflection amount (corresponding to the size of the density unevenness). Specifically, "Table 1" is selected when the flight deflection amount is smaller than a first threshold, "Table 3" is selected when the flight deflection amount is greater than a second threshold, and "Table 2" is selected when the flight deflection amount is located between the first threshold and the second threshold. However, the invention is not limited thereto, and it may be possible to use combinations of any two kinds of dot ratio tables (for example, Table 1 and Table 2) according to the size of the flight deflection amount or the density fluctuation amount (the size of the density unevenness) among the three kinds of tables.

Hereinafter, a method of using combinations of two kinds of dot ratio tables will be described specifically with reference to FIG. 36. Here, FIG. 36 is a view showing the relationship between the flight deflection amount (the density fluctuation amount), and the use ratio of the dot ratio tables 1 to 3 shown in FIGS. 12A to 12C.

Referring to FIGS. 12A to 12C, the generation ratios of S dot and L dot of Table 1 (FIG. 12A) are defined as S1 and L1, respectively, the generation ratios of S dot and L dot of Table 2 (FIG. 12B) are defined as S2 and L2, respectively, and the generation ratios of S dot and L dot of Table 3 (FIG. 12C) are defined as S3 and L3, respectively. Here, a case where the generation ratio of S dot and L dot for a target nozzle (processing region) is determined will be described using the table use ratio shown in FIG. 36. In addition, the first threshold and second threshold in FIG. 36 are the thresholds in FIG. 19.

Figure 36:
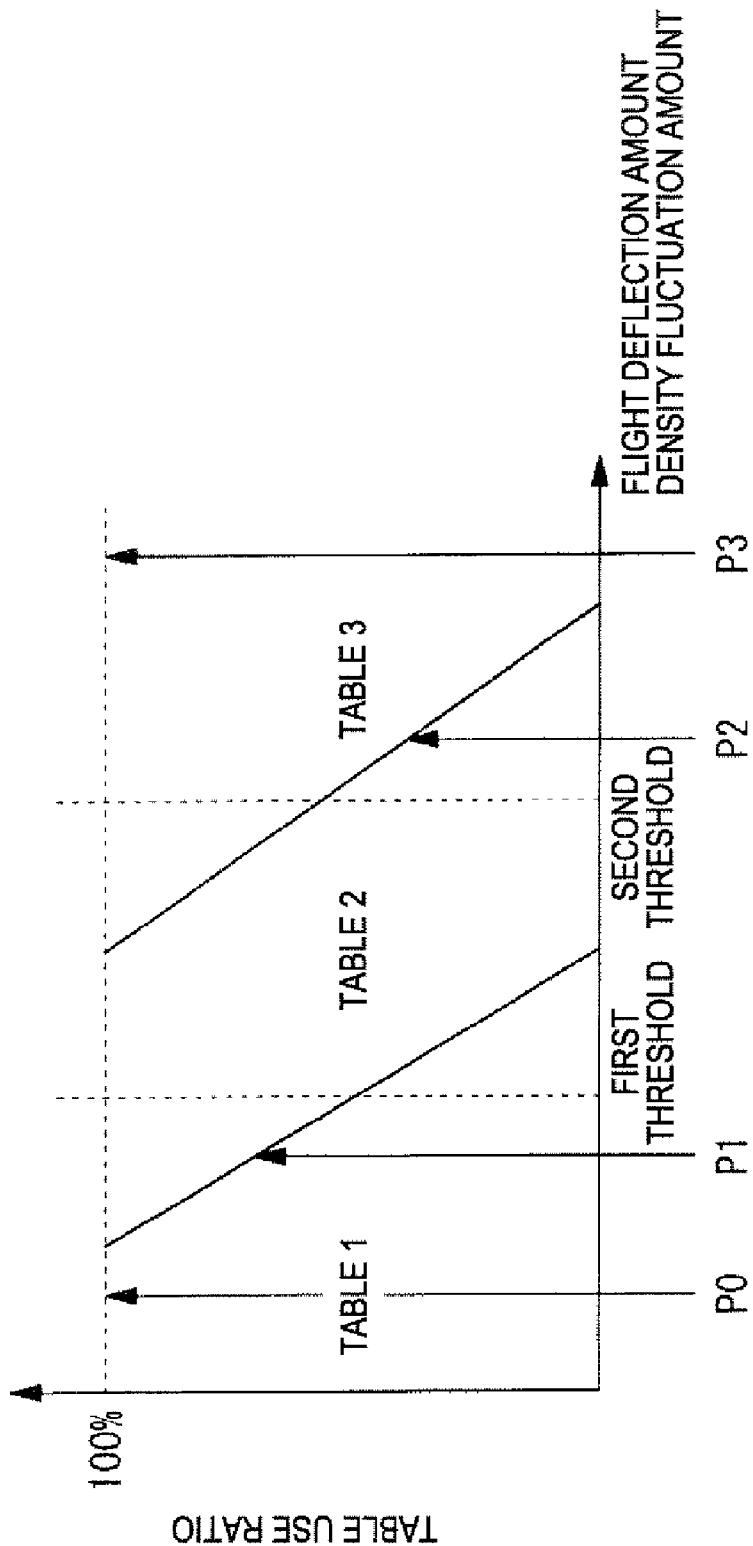
FIG. 36 is a view showing the relationship between the flight deflection amount (the density fluctuation amount), and the use ratio of the dot ratio tables 1 to 3 shown in FIGS. 12A to 12C.

The density fluctuation amount (the flight deflection amount) of the target nozzle (processing region) is defined as P1 shown in FIG. 36. As shown in FIG. 36, P1 is a value obtained by combining two kinds of tables, i.e., Table 1 and Table 2. Hereinafter, description will be made assuming that the use ratio of Table 1 and Table 2 is 7:3. In this case, as shown in the following Expression (1), the sum of the result obtained by multiplying the generation ratio of S dot of Table 1 by 0.7 in the amount P1 of density fluctuation (the flight deflection amount) and the result obtained by multiplying the generation ratio of S dot of Table 2 by 0.3 becomes the generation ratio of S dot when Table 1 and Table 2 are combined. Similarly, as shown in the following Expression (2), the sum of the result obtained by multiplying the generation ratio of L dot of Table 1 by 0.7 in the amount P1 of density fluctuation (the flight deflection amount) and the result obtained by multiplying the generation ratio of L dot of Table 2 by 0.3 becomes the generation ratio of L dot when Table 1 and Table 2 are combined.

$$\text{Generation ratio of } S \text{ dot when Tables 1 and 2 are combined} = 0.7S1 + 0.3S2 \tag{1}$$

$$\text{Generation ratio of } L \text{ dot when Tables 1 and 2 are combined} = 0.7L1 + 0.3L2 \tag{2}$$

Similarly, a case in which the density fluctuation amount (the flight deflection amount) of the target nozzle (processing region) is P2 shown in FIG. 36 will be described. As shown in FIG. 36, P2 is a value obtained by combining two kinds of tables, i.e., Table 2 and Table 3. Hereinafter, a description will be made assuming that the use ratio of Table 2 and Table 3 is 4:6. In this case, as shown in the following Expression (3), the sum of the result obtained by multiplying the generation ratio of S dot of Table 2 by 0.4 in the amount P2 of density fluctuation (the flight deflection amount) and the result obtained by multiplying the generation ratio of S dot of Table 2 by 0.6 becomes the generation ratio of S dot when Table 2 and Table 3 are combined. Similarly, as shown in the following Expression (4), the sum of the result obtained by multiplying the generation ratio of L dot of Table 1 by 0.4 in the amount P2 of density fluctuation (the flight deflection amount) and the result obtained by multiplying the generation ratio of L dot of Table 3 by 0.6 becomes the generation ratio of L dot when Table 2 and Table 3 are combined.

$$\text{Generation ratio of } S \text{ dot when Tables 2 and 3 are combined} = 0.4S2 + 0.6S3 \tag{3}$$

$$\text{Generation ratio of } L \text{ dot when Tables 2 and 3 are combined} = 0.4L2 + 0.6L3 \tag{4}$$

As described above, in a case in which the density fluctuation amount (the flight deflection amount) of a target nozzle (processing region) is a value that is smaller than the first threshold and approximate to the first threshold like P1 shown in FIG. 36, N-valued data can be generated in a more suitable dot generation ratio by using a combination of Table 1 and Table 2 according to a predetermined ratio without using only Table 1 as in the above first and second embodiments. This is similarly applied to P2 of FIG. 36. Since this enables dots to be formed in a more suitable mixing ratio, the density unevenness can be eliminated more effectively.

Further, in a case in which the density fluctuation amount (the flight deflection amount) of a target nozzle (processing region) is P0 and P3 shown in FIG. 36, the generation ratio of S dot is determined by using only Table 1 because P0 is a value that is smaller than the first threshold and away from the first threshold, and the generation ratio of L dot is determined by using only Table 3 because P3 is a value that is greater than the second threshold, and away from the second threshold.

What is claimed is:

1. A printing apparatus comprising:
    a print head in which a plurality of nozzles which can print different sizes of dots are arranged;
    an image data acquiring unit which acquires image data having M-value density information (M≧3) for every pixel;
    a density unevenness information acquiring unit which acquires information on density unevenness of the nozzles of the print head;
    an N-valued data generating unit which performs N-valued processing (M>N≧2) on the image data acquired by the image data acquiring unit to generate N-valued data;
    a print data generating unit which generates print data from the N-valued data generated by the N-valued data generating unit; and
    a printing unit which performs printing using the print head based on the print data generated by the print data generating unit,
    wherein the N-valued data generating unit determines generation ratios of the different sizes of dots for every predetermined region of the image data acquired by the image data acquiring unit based on the density unevenness information acquired by the density unevenness information acquiring unit, and performs N-valued processing (M>N≧2) on the image data based on the determined generation ratios.

2. The printing apparatus according to claim 1,
    wherein the information on the density unevenness includes information on a difference value between a density value of a dot formed by each of the nozzles of the print head and an assumed density value.

3. The printing apparatus according to claim 2,
    wherein if it is determined that the difference value of the density value of the dot to be formed by each of the nozzles of the print head is greater than a predetermined threshold based on the information on the density unevenness, the N-valued data generating unit makes the density value greater than a density value that is generated when the generation ratio of large-sized dots is not determined.

4. The printing apparatus according to claim 3, further comprising:
    a density unevenness correcting unit which corrects the density value of each pixel of the image data acquired by the image data acquiring unit based on the density unevenness information acquired by the density unevenness information acquiring unit,
    wherein the N-valued data generating unit performs N-valued processing on the image data corrected by the density unevenness correcting unit to generate N-valued data.

5. The printing apparatus according to claim 4,
    wherein the dot ratio information selecting unit selects a predetermined item of dot ratio information from the dot ratio information stored in the dot ratio information storing unit for every plural nozzles including a target nozzle of the print head, and nozzles proximate the target nozzle.

6. The printing apparatus according to claim 4,
    wherein the dot ratio information selecting unit selects a predetermined item of dot ratio information among the dot ratio information stored in the dot ratio information storing unit based on the information on a print head printing position deviation amount among the density unevenness information acquired by the density unevenness information acquiring unit.

7. The printing apparatus according to claim 4,
    wherein the dot ratio information selecting unit is adapted to select two or more kinds of dot ratio information among the dot ratio information stored in the dot ratio information storing unit based on the information on a printing position deviation amount of the print head among the density unevenness information acquired by the density unevenness information acquiring unit, and
    wherein the N-valued data generating unit determines the generation ratios of the different sizes of dots for every predetermined region of the image data based on the two or more kinds of dot ratio information selected by the dot ratio information selecting unit, and performs N-valued processing (M>N≧2) on the image data based on the determined generation ratios.

8. The printing apparatus according to claim 3, further comprising:
    a dot ratio information storing unit which stores dot ratio information which specifies mixing ratios of the different sizes of dots, and
    a dot ratio information selecting unit which selects a predetermined item of dot ratio information among the dot ratio information stored in the dot ratio information storing unit based on the density unevenness information acquired by the density unevenness information acquiring unit,
    wherein the N-valued data generating unit determines the generation ratios of the different sizes of dots for every predetermined region of the image data acquired by the image data acquiring unit based on the dot ratio information selected by the dot ratio information selecting unit, and performs N-valued processing (M>N≧2) on the image data based on the determined generation ratios.

9. The printing apparatus according to claim 3, further comprising:
    a density unevenness correcting unit which corrects the density value of each pixel of the image data acquired by the image data acquiring unit based on the density unevenness information acquired by the density unevenness information acquiring unit,
    a dot ratio information storing unit which stores dot ratio information which specifies mixing ratios of the different sizes of dots, and
    a dot ratio information selecting unit which selects a predetermined item of dot ratio information among the dot ratio information stored in the dot ratio information storing unit based on the density unevenness information acquired by the density unevenness information acquiring unit, wherein the N-valued data generating unit determines the generation ratios of the different sizes of dots for every predetermined region of the image data corrected by the density unevenness correcting unit based on the dot ratio information selected by the dot ratio information selecting unit, and performs N-valued processing (M>N≧2) on the image data based on the determined generation ratios.

10. A printing program stored on a computer readable medium for causing a computer to function as:
    an image data acquiring unit which acquires image data having M-value density information (M≧3) for every pixel;
    a density unevenness information acquiring unit which acquires information on density unevenness of the nozzles of a print head which can print different sizes of dots;
    an N-valued data generating unit which performs N-valued processing (M>N≧2) on the image data acquired by the image data acquiring unit to generate N-valued data;
    a print data generating unit which generates print data from the N-valued data generated by the N-valued data generating unit; and
    a printing unit which performs printing based on the print data generated by the print data generating unit,
    wherein the program causes the N-valued data generating unit to determine generation ratios of the different sizes of dots for every predetermined region of the image data acquired by the image data acquiring unit based on the density unevenness information acquired by the density unevenness information acquiring unit, and to perform N-valued processing (M>N≧2) on the image data based on the determined generation ratios.

11. A printing method comprising:
    acquiring image data having M-value density information (M≧3) for every pixel;
    acquiring information on density unevenness of nozzles of a print head which can print different sizes of dots;
    performing N-valued processing (M>N≧2) on the image data acquired in the step of acquiring the image data to generate N-valued data;
    generating print data from the N-valued data generated in the step of generating the N-valued data; and
    performing printing using the print head based on the print data generated in the step of generating the print data,
    wherein, in the step of generating the N-valued data, generation ratios of the different sizes of dots are determined for every predetermined region of the image data acquired in the step of generating the image data based on the density unevenness information acquired in the step of acquiring the density unevenness information, and N-value processing (M>N≧2) is performed on the image data based on the determined generation ratios.

12. An image processing apparatus comprising:
    an image data acquiring unit which acquires image data having M-value density information (M≧3) for every pixel;
    a density unevenness information acquiring unit which acquires information on density unevenness of nozzles of a print head which can print different sizes of dots;
    an N-valued data generating unit which performs N-valued processing (M>N≧2) on the image data acquired by the image data acquiring unit to generate N-valued data;
    a print data generating unit which generates print data from the N-valued data generated by the N-valued data generating unit; and
    a printing unit which performs printing based on the print data generated by the print data generating unit,
    wherein the N-valued data generating unit determines generation ratios of the different sizes of dots for every predetermined region of the image data acquired by the image data acquiring unit based on the density unevenness information acquired by the density unevenness information acquiring unit, and performs N-valued processing (M>N≧2) on the image data based on the determined generation ratios.

13. An image processing program stored on a computer readable medium for causing a computer to function as:
    an image data acquiring unit which acquires image data having M-value density information (M≧3) for every pixel;
    a density unevenness information acquiring unit which acquires information on density unevenness of nozzles of a print head which can print different sizes of dots;
    an N-valued data generating unit which performs N-valued processing (M>N≧2) on the image data acquired by the image data acquiring unit to generate N-valued data; and
    a print data generating unit which generates print data from the N-valued data generated by the N-valued data generating unit,
    wherein the program causes the N-valued data generating unit to determine generation ratios of the different sizes of dots for every predetermined region of the image data acquired by the image data acquiring unit based on the density unevenness information acquired by the density unevenness information acquiring unit, and to perform N-valued processing (M>N≧2) on the image data based on the determined generation ratios.

14. An image processing method comprising:
    acquiring image data having M-value density information (M≧3) for every pixel;
    acquiring information on density unevenness of nozzles which can print different sizes of dots;
    performing N-valued processing (M>N≧2) on the image data acquired in the step of acquiring the image data to generate N-valued data; and
    generating print data from the N-valued data generated in the step of generating the N-valued data,
    wherein, in the step of generating the N-valued data, generation ratios of the different sizes of dots are determined for every predetermined region of the image data acquired in the step of generating the image data based on the density unevenness information acquired in the step of acquiring the density unevenness information, and N-value processing (M>N≧2) is performed on the image data based on the determined generation ratios.

* * * * *